(12) United States Patent
Reuter

(10) Patent No.: US 8,495,266 B2
(45) Date of Patent: Jul. 23, 2013

(54) DISTRIBUTED LOCK

(75) Inventor: James M. Reuter, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2046 days.

(21) Appl. No.: 11/009,214

(22) Filed: Dec. 10, 2004

(65) Prior Publication Data

US 2006/0129556 A1 Jun. 15, 2006

(51) Int. Cl.
*G06F 12/00* (2006.01)

(52) U.S. Cl.
USPC .......................................... 710/242; 709/248

(58) Field of Classification Search
USPC .................. 710/200, 240–242; 709/229, 248; 719/312–313; 714/12
See application file for complete search history.

(56) References Cited

U.S. PATENT DOCUMENTS

| | | | |
|---|---|---|---|
| 5,454,108 A | | 9/1995 | Devarakonda et al. |
| 5,809,220 A | * | 9/1998 | Morrison et al. ................ 714/12 |
| 6,041,383 A | * | 3/2000 | Jeffords et al. ................ 710/200 |
| 6,175,853 B1 | | 1/2001 | Stracke, Jr. |
| 2003/0065896 A1 | | 4/2003 | Krueger |
| 2003/0135677 A1 | * | 7/2003 | Louzoun et al. ............... 710/240 |
| 2004/0019892 A1 | * | 1/2004 | E. et al. ......................... 718/107 |
| 2005/0149634 A1 | * | 7/2005 | McKenney .................... 709/248 |

FOREIGN PATENT DOCUMENTS

EP    0682312    11/1995

OTHER PUBLICATIONS

GB Search Report, Application GB0523073.5, Jan. 17, 2006, 3 pps.

* cited by examiner

*Primary Examiner* — Clifford Knoll

(57) ABSTRACT

Various embodiments of the present invention are directed to a distributed lock and distributed locking protocol to allow multiple communicating entities to share access to a computing resource. Certain embodiments of the present invention employ a data storage register implemented by the communicating entities to hold a value reflective of a distributed lock state.

35 Claims, 23 Drawing Sheets

```
                                                            2004
1:      procedure read()
2:          replies ⟵ majority([Read, val-ts])
3:          if the status in all replies is true then return val
4:          else return recover()
                                                            2008
1:      procedure write (val)
2:          ts ⟵ newTS()
3:          replies ⟵ majority([Order, ts])
4:          if any status in a reply is false then return NOK
5:          replies ⟵ majority([Write, val, ts])
6:          if the status in all replies is true then return OK
7:          else return NOK 1:      procedure recover()                                 2006
2:          ts ⟵ newTS()
3:          replies ⟵ majority([Order&Read, ts])
4:          if any status in a reply is false then return NIL
5:          val ⟵ the value with highest val-ts from replies
6:          replies ⟵ majority([Write, val, ts])
7:          if the status in all replies is true then return val
8:          else return NIL
                                                            2002
1:      procedure majority(msg)
2:          Send msg to all, retransmitting periodically
3:          await receive(rep) from [ (n+1)/2 ] processes
4:            such that rep matches msg
5:          return set of received replies
                                                            2010
        read Handler()
1:      when receive [Read, ts] from coordinator
2:          status ⟵ (ts = val-ts and ts ≥ ord-ts)
3:          reply [Read-R, status] to coordinator
                                                            2012
        write Handler()
1:      when receive [Write, new-val, ts] from coordinator
2:          status ⟵ (ts > val-ts and ts ≥ ord-ts)
3:          if status then
4:              val ⟵ new-val; store(val)
5:              val-ts ⟵ ts; store(val-ts)
6:          reply [Write-R, status] to coordinator
                                                            2014
        order&read Handler()
1:      when receive [Order&Read, ts] from coordinator
2:          status ⟵ (ts > max (val-ts, ord-ts))
3:          if status then ord-ts ⟵ ts; store(ord-ts)
4:          reply [Order&Read-R, val-ts, val, status]
                                                            2016
        order Handler()
1:      when receive [Order, ts] from coordinator
2:          status ⟵ (ts > max (val-ts, ord-ts))
3:          if status then ord-ts ⟵ ts; store(ord-ts)
4:          reply [Order-R, status] to coordinator
```

Figure 20

DISTRIBUTED LOCK

TECHNICAL FIELD

The present invention is related to concurrency control for shared access of a computer resource by communicating entities and, in particular, to an efficient, robust distributed lease lock.

BACKGROUND OF THE INVENTION

With the initial development and rapid maturation of electronic communications systems, including both communications media and systems incorporated internally within computer systems as well as communications media and systems that interconnect discrete computer systems, a wide variety of distributed application-level and systems software have been developed to allow concurrent and simultaneous, parallel execution of processes distributed spatially and in time within computer systems and among interconnected processors and interconnected computer systems. In addition, interconnected processing entities, such as hardware systems controlled by logic circuits, firmware, or a combination of logic circuits and firmware, may also run in parallel, in a cooperative fashion.

In distributed systems, multiple processes and/or processing entities may share various device and computing resources accessible via a communications system, such as a computer network. In order for distributed systems to properly function, concurrent and simultaneous contention by multiple processes and/or processing entities for devices and computing resources needs to be controlled, in order to prevent uncontrolled, concurrent or simultaneous access of devices and computing resources that lead to timing dependencies and non-deterministic behavior. Such timing dependencies can lead to many different pathologies, including data corruption, process crashes, system deadlock, and process starvation. Many different techniques for facilitating distributed resource sharing by intercommunicating processes have been developed. However, currently available techniques have timing dependencies on communications message transmission and reception, and are therefore vulnerable to the vagaries of communications transmission delays, process instability, and other problems that arise in real-world distributed system. Moreover, many of the distributed-resource-sharing protocols involve message exchange inefficiencies, requiring significant message traffic to coordinate shared access to device and computing resources. Manufacturers, vendors, designers, and users of distributed systems therefore continue to seek reliable, robust, and efficient distributed-resource-sharing methods.

SUMMARY OF THE INVENTION

Various embodiments of the present invention are directed to a distributed lock and distributed locking protocol to allow multiple communicating entities to share access to a computing resource. Certain embodiments of the present invention employ a data storage register implemented by the communicating entities.

BRIEF DESCRIPTION OF THE DRAWINGS

FIG. 20 shows pseudocode implementations for the routine handlers and operational routines shown diagrammatically in FIG. 18.

DETAILED DESCRIPTION OF THE INVENTION

Embodiments of the present invention are directed to distributed locking protocols. Distributed locking protocols find use in implementation of distributed systems, including distributed applications and distributed systems software. Distributed locking protocols may also find use within a single computer system in which processes and processing entities concurrently or simultaneously access shared resources via message-based transactions, including packets transmitted over buses or shared memory messages.

Figure 1:
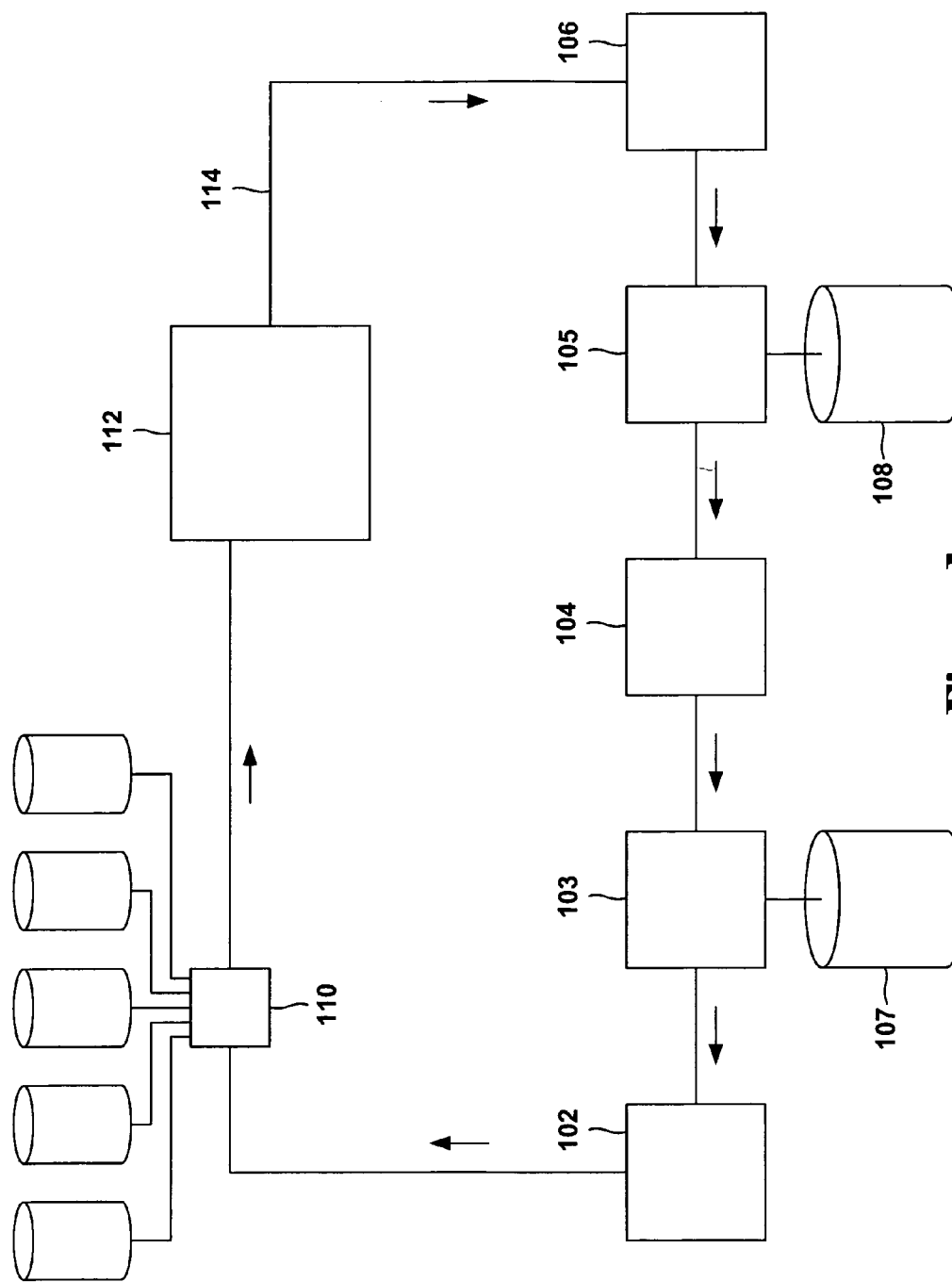
FIG. 1 shows an example of a distributed computing system.

FIG. 1 shows an example of a distributed computing system. The distributed computing system includes five different computer systems 102-106, two of which have large, local mass storage devices 107 and 108, a disk array 110, and a high-end routing node 112 that interconnects the processing entities and disk array with additional, remote computer systems, mass storage devices, and other electronic devices. In a network distributed system, such as that shown in FIG. 1, data is exchanged between processes and/or processing entities, the disk array, and the router node through one or more computer networks 114. Many different types of computer networks are employed for such purposes, including high-end fiber-channel interconnections, Ethernet interconnections, and many other types of networking systems and media that employ a variety of different protocols and configurations and that operate according to a variety of different message transmission methods, including bus-like transmission, ring-like transmission, point-to-point transmission, and other methods. In a distributed system, such as the distributed system shown in FIG. 1, processes running simultaneously or concurrently on different computer systems may share one or more resources. For example, processes running on both computer system 102 and computer system 103 may access the mass storage device 107 of computer system 103. As another example, processes running on all of the computer systems may share particular storage volumes provided by the disk array 110. Note that a computer system, such as computer system 102, may include one to a large number of individual computer processors, and may support concurrent execution of thousands of processes and simultaneous execution of tens to hundreds of processes. Data resources are but one example of shared resources. Many other types of resources may be shared. For example, in distributed operating systems, processors within processing entities may be shared by logical processing domains within the distributed operating system. Data input and output devices may be shared between processing entities, communications devices may be shared by multiple processes, and many other types of devices, both physical and logical, may be shared among distributed processes, as well as actively access and share other types of devices.

Figure 2:
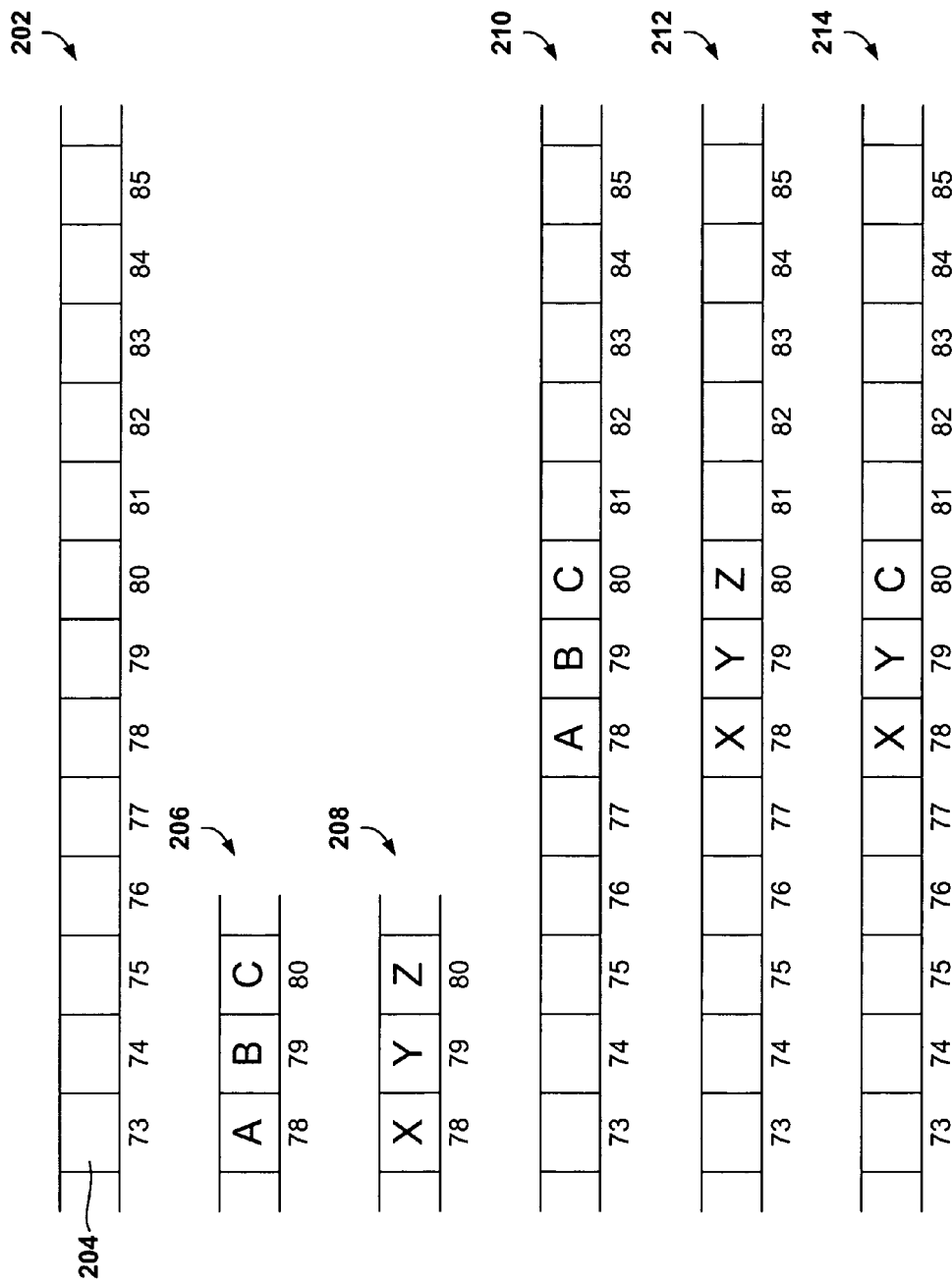
FIGS. 2-3 illustrate one simple type of concurrency problem encountered in distributed computer systems.
Figure 3:
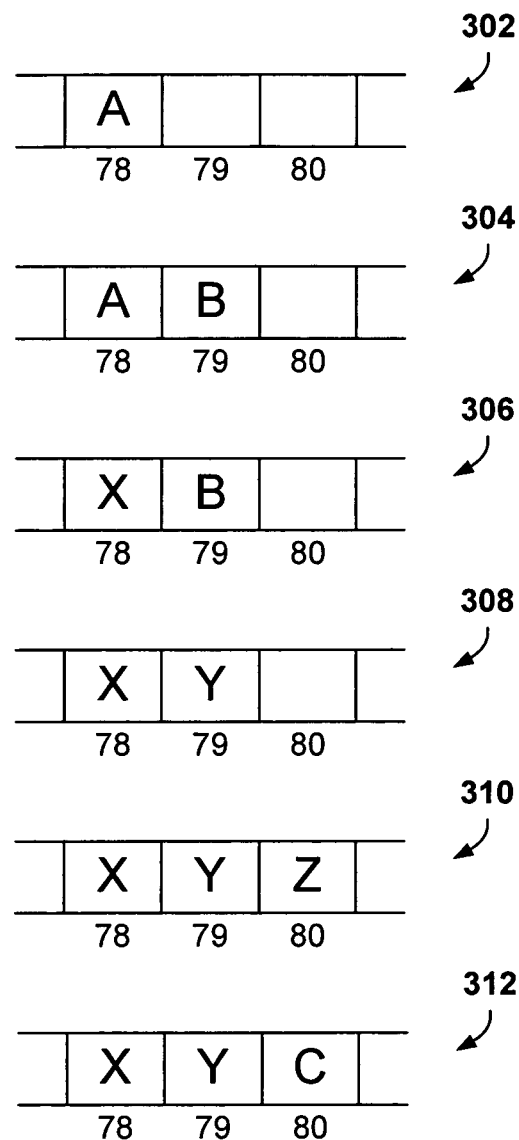

Sharing of distributed resources by distributed processes involves management of many different types of concurrency problems. FIGS. 2-3 illustrate one simple type of concurrency problem encountered in distributed computer systems. At the top of FIG. 2, a representation of a portion of a data-storage resource 202 is shown. The data-storage-resource data blocks, such as data block 204, are logically, sequentially ordered in the data-storage device. A portion of the data resource represented in FIG. 2 includes 13 data blocks, sequentially addressed as data blocks 73-85. A first process running on one processing entity needs to store three consecutive data-block values 206, represented in FIG. 2 by the symbols "A," "B," and "C," in the blocks of the data-storage resource 78, 79, and 80. A second process needs to store three different data-block values 208, represented in FIG. 2 by the symbols "X," "Y," and "Z," in the same three consecutive data blocks of the data-storage resource 78-80. In this example, both the first and second processes contend for data blocks 78-80 of the data resource. Either of two possible outcomes of this contention is valid and acceptable. One outcome is that the first process writes the data-block values "A," "B," and "C" to data blocks 78-80 of the data resource 210. This may occur either in the case that the second process fails to write data-block values "X," "Y," and "Z" to the data-storage resource, or the second process successfully writes these data-block values to the data-storage resource, but these data-block values are then overwritten with the data-block values "A," "B," and "C" by the first process. Similarly, a second valid and acceptable outcome 212 is for the second process to successfully write data-block values "X," "Y," and "Z" to data blocks 78-80 of the data-storage resource.

There are, however, many invalid and unacceptable outcomes of the contention for access to the data-storage resource by the first and second processes, including an outcome 214 in which the second process has managed to write data-block values "X" and "Y" to blocks 78-79 of the data-storage resource, and the first process has successfully written the value "C" to data block 80 of the data-storage resource. The invalid and unacceptable outcome 214 in FIG. 2 is but one example of many different invalid and unacceptable outcomes that may result from the contention by the processes for the shared data-storage resource.

FIG. 3 illustrates a sequence of events that may lead to the invalid and unacceptable outcome 214 in FIG. 2. First, the first process writes the data-block value "A" to block 78 of the shared data-storage resource 302. Then, in a second WRITE operation, the first process writes the data-block value "B" to block 79 of the shared, data-storage resource 304. Next, the second process overwrites data block 78 with the data-block value "X" 306. Then, the second process overwrites data block 79 with the data-block value "Y" 308. Then, the second process writes the data-block "Z" to data block 80 310. Finally, the first process overwrites data block 80 with the data-block value "C" 312.

The problem illustrated in FIGS. 2-3 is a common problem that arises in database management systems and shared file systems. The data blocks 78-80 may be thought of as storing a large data record, different parts of which contain references to other parts of the data record or other data stored elsewhere in the file. If portions of the large data record are overwritten with inconsistent data, the data record, as a whole, becomes inconsistent, and can lead to cascading data errors by subsequent access operations and, in worse cases, can lead to corruption of a database or file system and to crashes of processes accessing the data.

Figure 4:
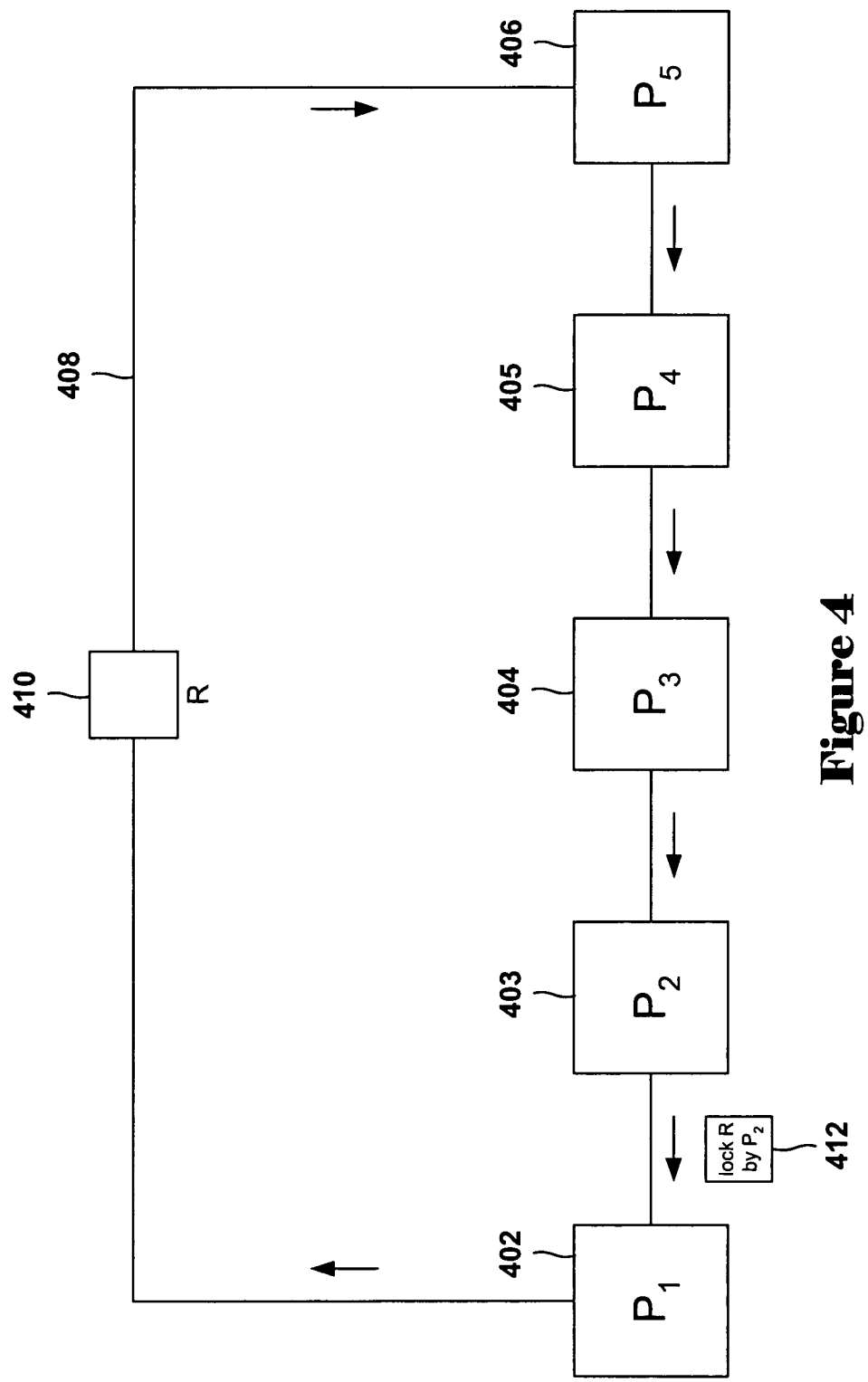
FIGS. 4-7 illustrate the concept of locking.
Figure 5:
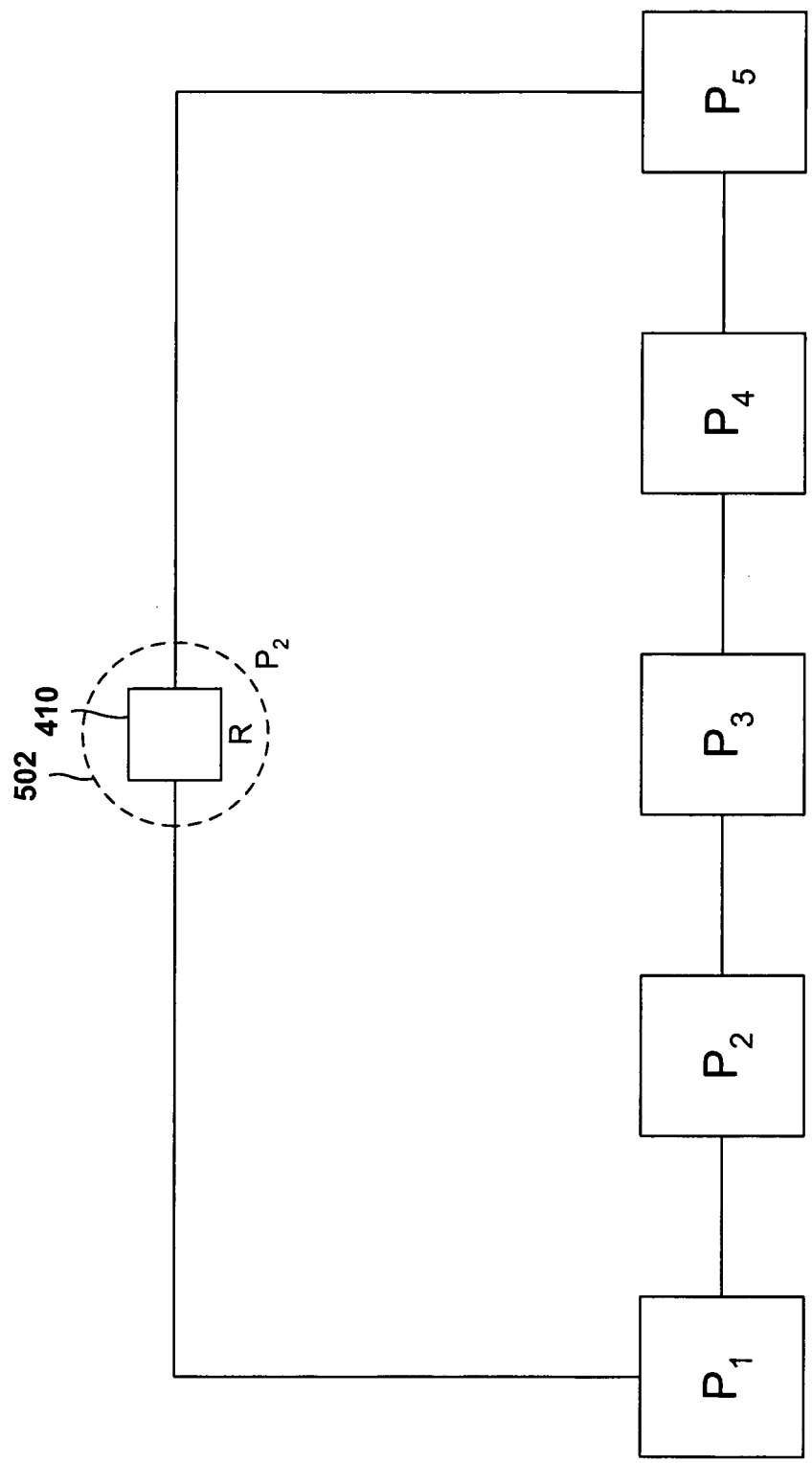
Figure 6:
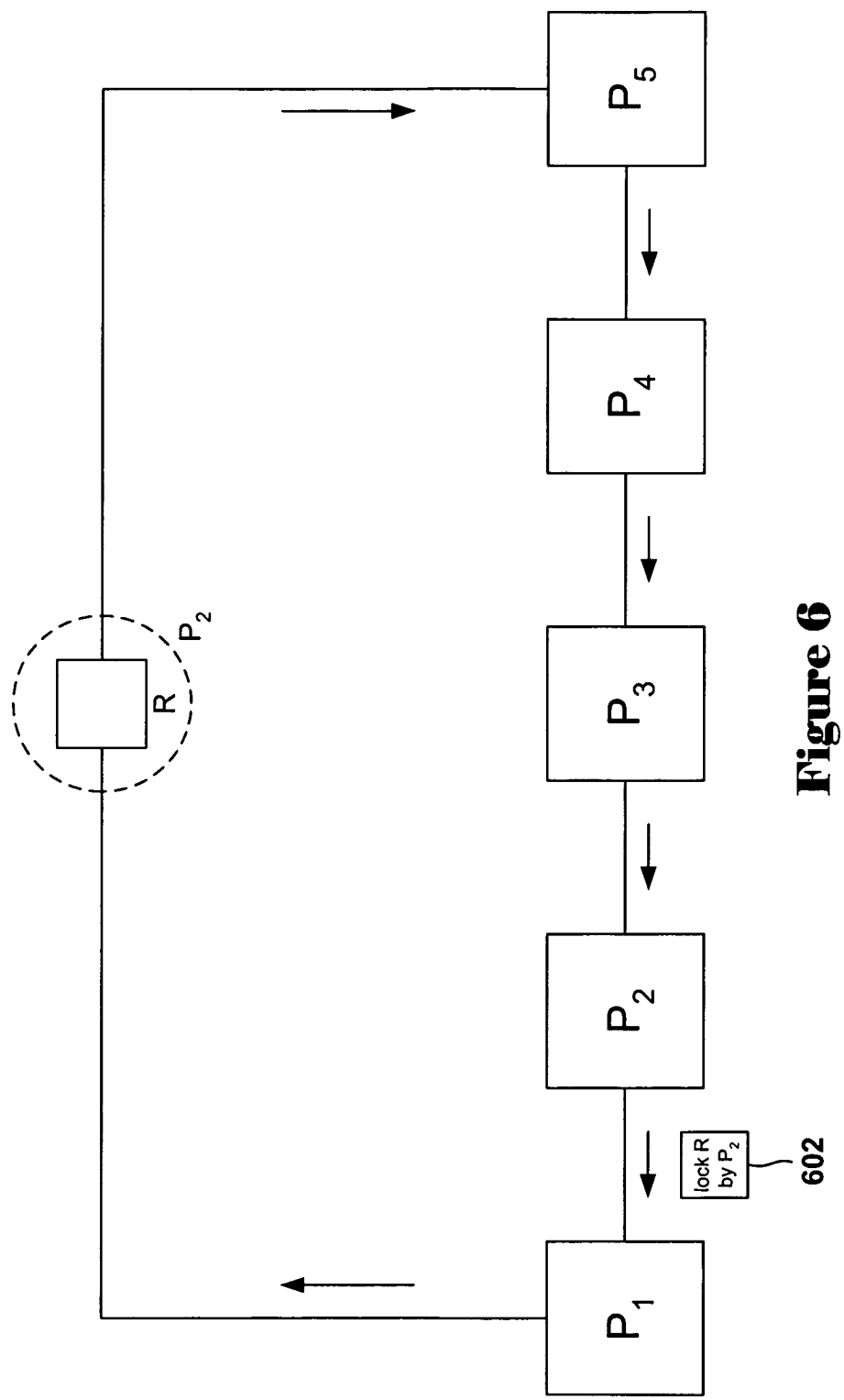
Figure 7:
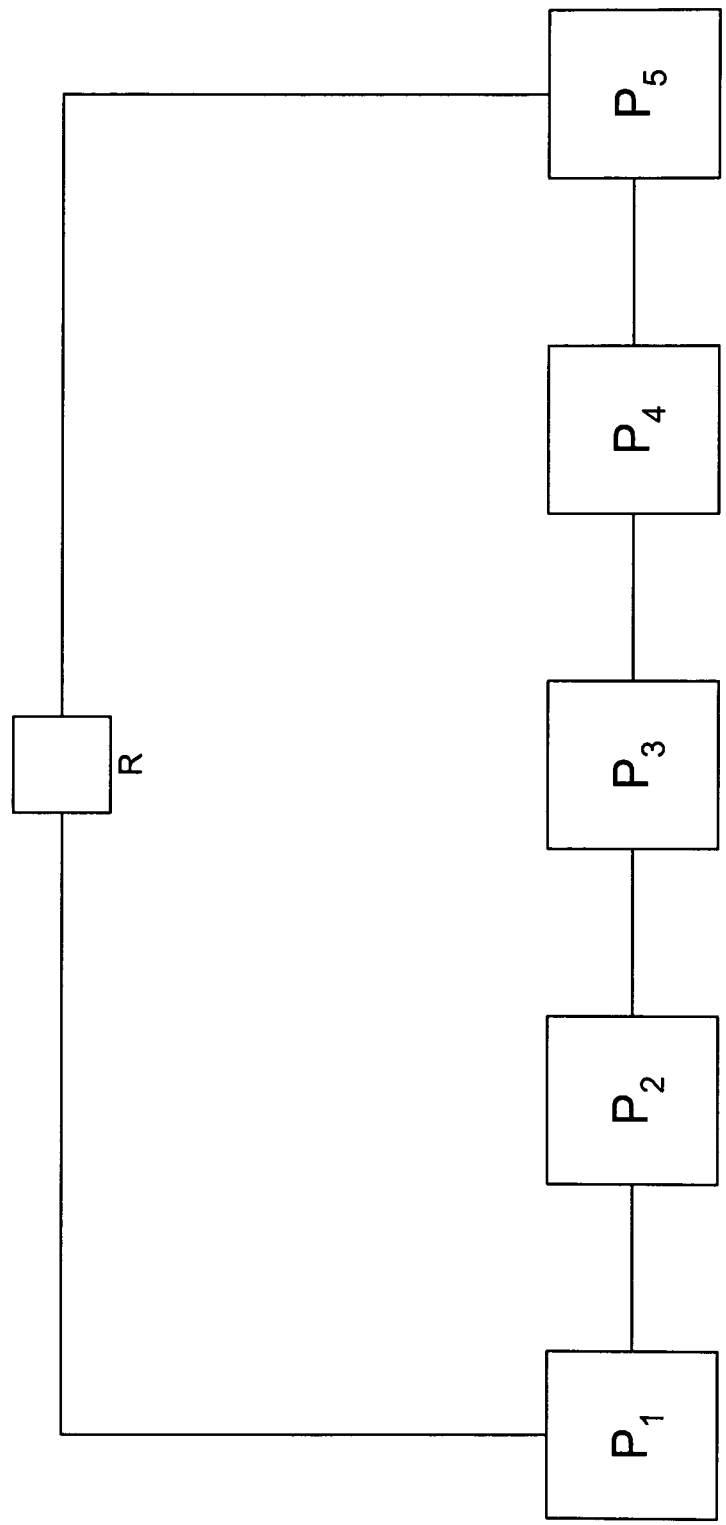

In order to prevent the various types of invalid and unacceptable outcomes of resource contention, such as the corrupted-data-block example illustrated in FIGS. 2-3, many techniques have been employed. One technique involves locking a resource by a process before accessing the resource by the process. FIGS. 4-7 illustrate the concept of locking. All of FIGS. 4-7, and subsequent figures, employ identical illustration conventions described only for FIG. 4, in the interest of brevity. FIG. 4 shows five computer systems 402-406 interconnected by a communications network 408 with each other and with a shared resource R 410 accessed by processes running on the computer systems. To lock the resource, a process $P_2$ running on the second processing entity transmits a message 412 to the other processes to indicate the process $P_2$ intends to lock resource R for access. Once process $P_2$ determines that the message 412 is successfully sent, process $P_2$ considers the resource R 410 to be locked for exclusive access by process $P_2$, indicated in FIG. 5 by the dashed circle 502 surrounding resource R. Once process $P_2$ finishes accessing resource R, process $P_2$ sends an unlock message 602 to the other processes, as shown in FIG. 6. As shown in FIG. 7, once process $P_2$ determines that the unlock message has been successfully transmitted, process $P_2$ considers the lock on resource R to be removed.

Figure 8:
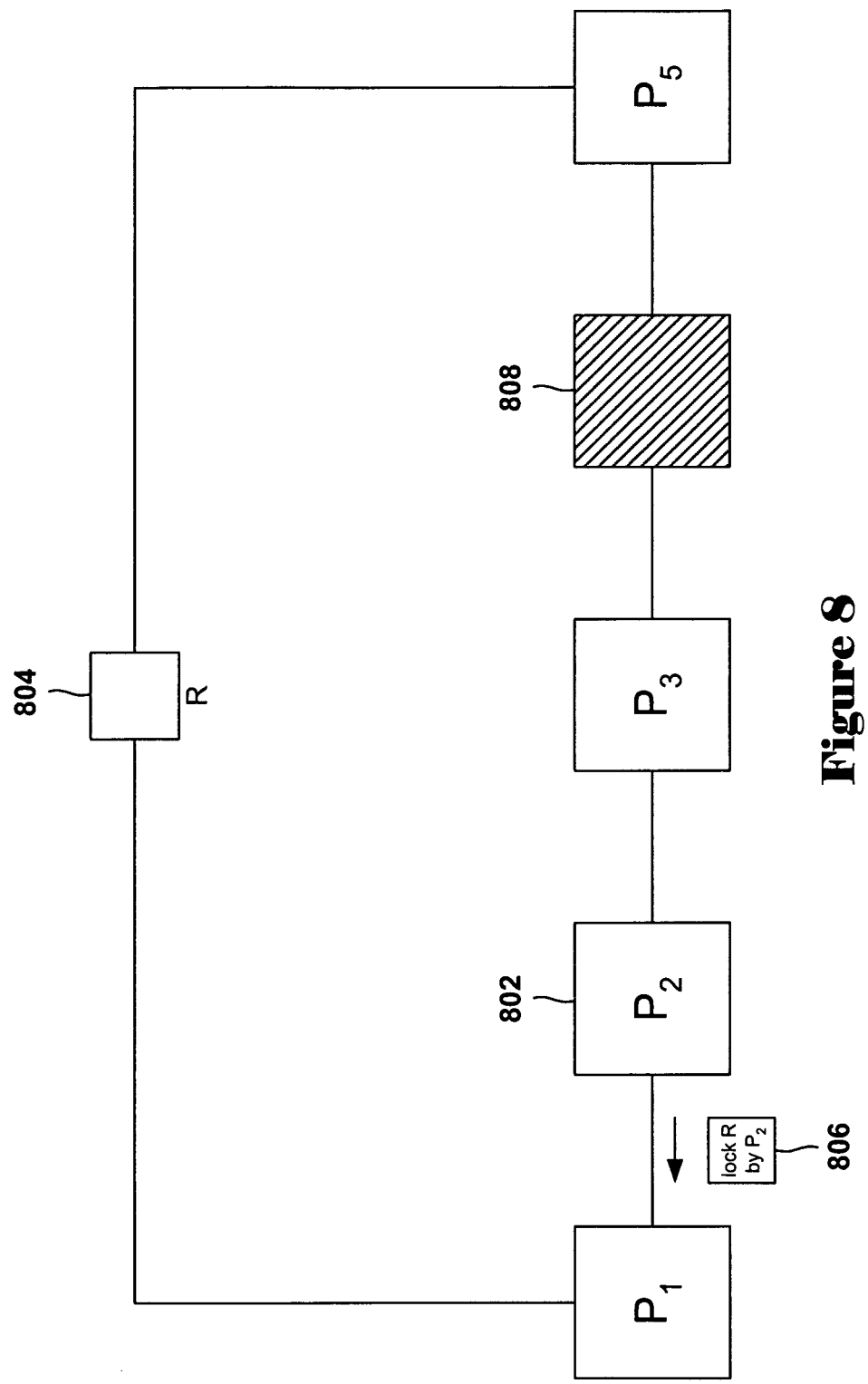
FIGS. 8-10 illustrate one of the many problems that arise in distributed systems that naively employ distributed locks in order to serialize access to resources by intercommunicating processes running on distributed processing entities.
Figure 9:
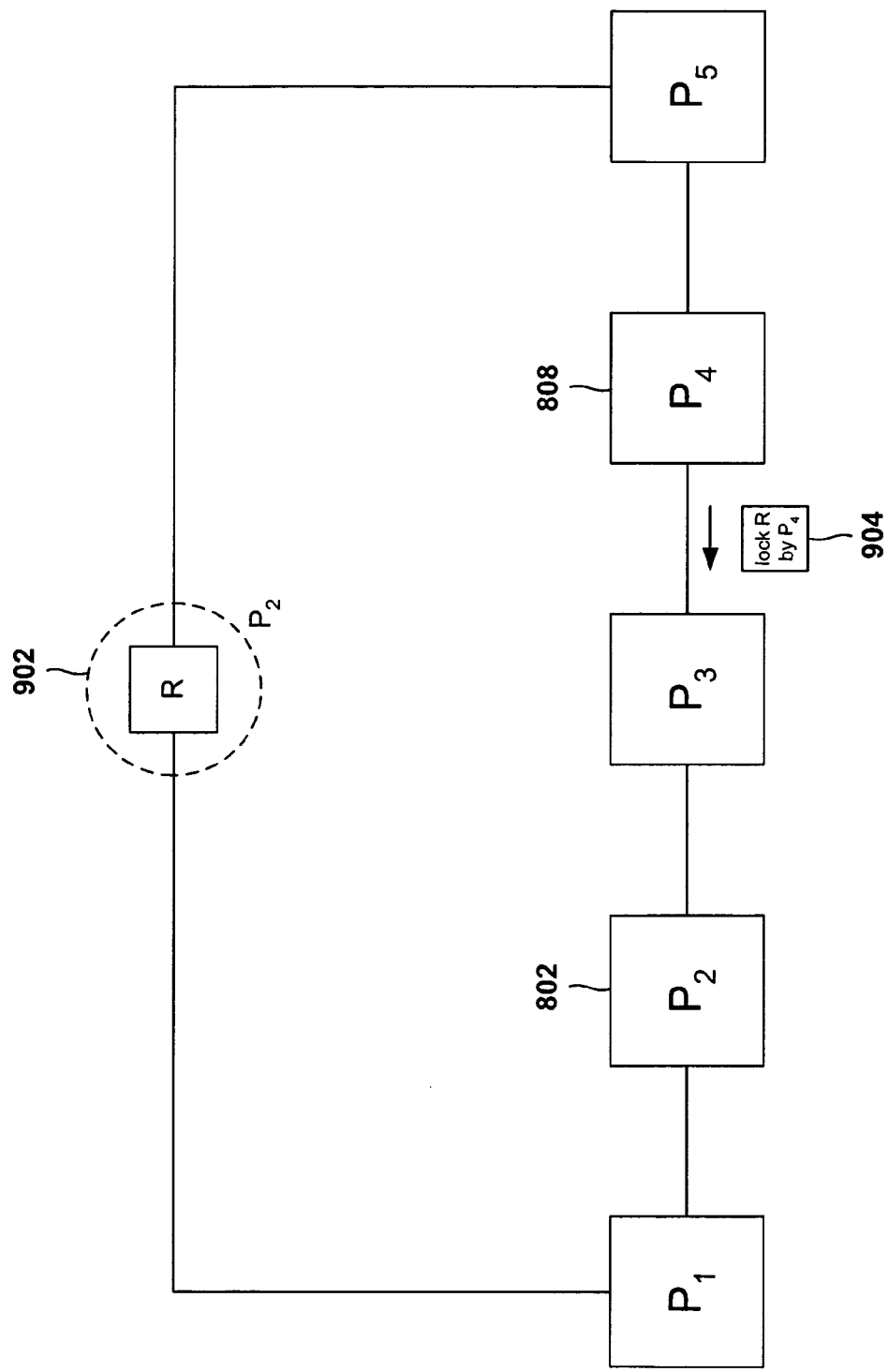
Figure 10:
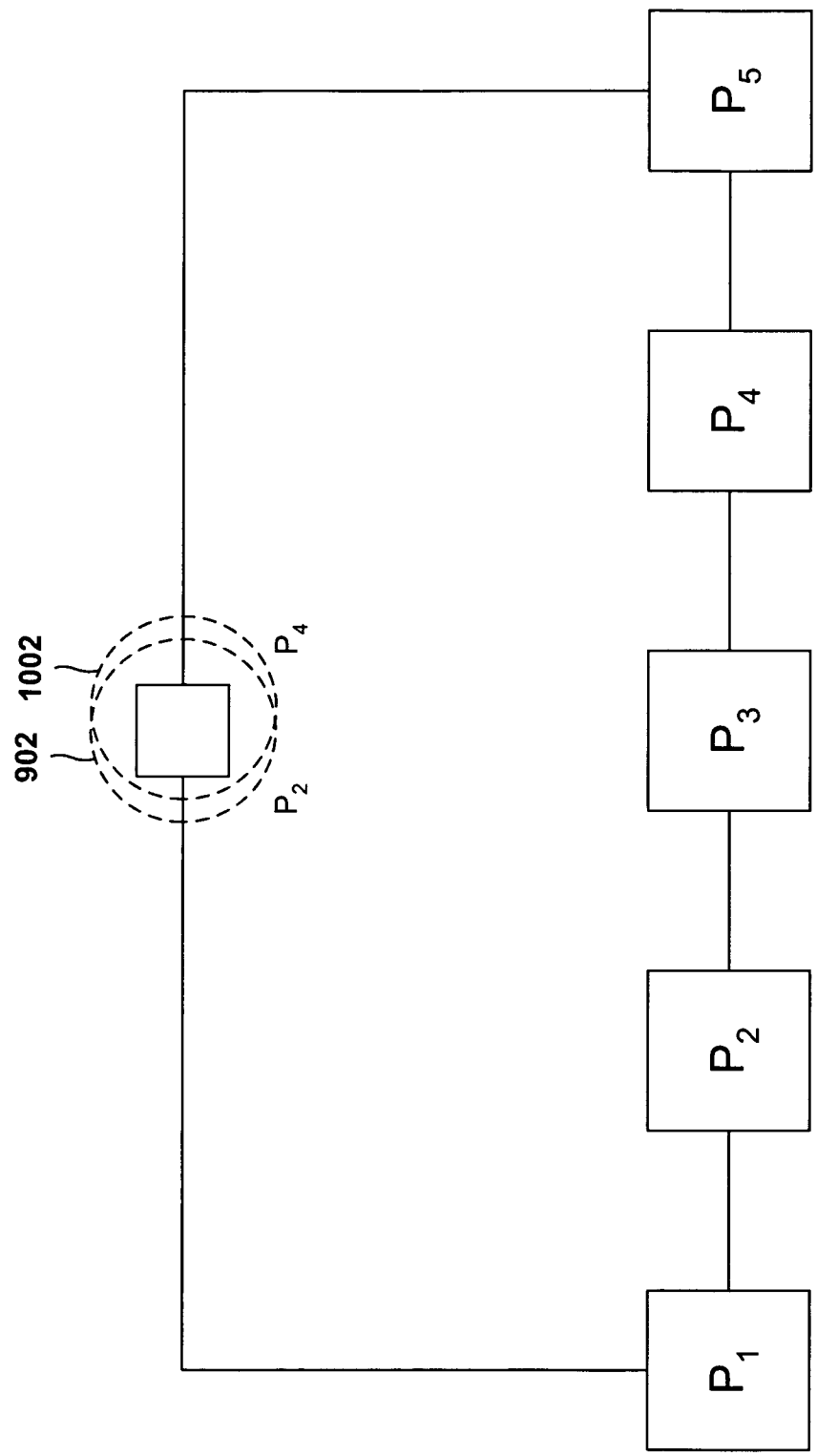

Unfortunately, distributed locking of resources is fraught with many potential problems. FIGS. 8-10 illustrate one of the many problems that arise in distributed systems that naively employ distributed locks in order to serialize access to resources by intercommunicating processes running on distributed processing entities. In FIG. 8, process $P_2$ 802 elects to access resource R 804, first sending a lock message 806 through the network to other processes running on other computer systems. However, the process $P_4$, which also accesses resource R, is currently down 808. As shown in FIG. 9, once process $P_2$ determines that the lock message has been successfully transmitted, process $P_2$ considers resource R to be locked 902. At this point, process $P_4$ 804 resumes running, and decides to access resource R. Because process $P_4$ was down when process $P_2$ 802 sent the lock message, process $P_4$ is not aware that process $P_2$ considers resource R to be locked. Therefore, process $P_4$ sends a lock message 904 to the other processes running on the other computer systems. As shown in FIG. 10, when process $P_4$ determines that the lock message has been successfully transmitted, process $P_4$ considers resource R to be locked 1002 by process $P_4$, despite the fact that process $P_2$ considers resource R to be locked 902 by process $P_2$. Both processes $P_2$ and $P_4$ then contend for resource R concurrently, potentially leading to problems, such as the problem illustrated in FIG. 3.

There are many naïve, potential solutions to the problem illustrated above in FIGS. 8-10. For example, when process $P_2$ receives the lock message from process $P_4$, process $P_2$ could send a warning message to process $P_4$, informing process $P_4$ that process $P_2$ considers resource R to be locked. However, this message could be lost or delayed, allowing both processes $P_2$ and $P_4$ to concurrently contend for resource R. Another solution might be to associate a processing entity with resource R and allow the associated processing entity to manage a lock on behalf of resource R, single threading all lock requests in order to prevent concurrent contention for resource R. However, it may be the case that process $P_2$ successively obtains a lock on resource R, and then crashes. Resource R then remains locked, while the resource is unused, preventing other processes from accessing resource R even though process $P_2$ is not running. Worse, process $P_2$ may restart, oblivious to the fact that process $P_2$, in a previous incarnation, had locked resource R, and therefore is unable itself to access resource R. One attempt to handle such problems may be to associate a timer with locks in the processing entity associated with resource R, so that locks automatically expire after a specified period of time. However, when the lock expires, a process holding the lock needs to be informed of the expiration, to prevent that process from concurrently accessing the resource along with a process that subsequently obtains a lock on the resource. However, such notification messages may be delayed and lost. The processing entity associated with resource R may, in order to handle such problems, return a timed authorization code along with the lock, and monitor access of the resource to ensure that only authorized processes access the resource. However, the processing entity associated with resource R may itself crash, authorization messages may be lost or delayed, or the processing entity associated with resource R may itself suffer concurrent contention problems internally, when attempting to lock or release resource R on behalf of concurrently contending remote processes. Provably correct distributed locking protocols are available, but these protocols generally are vulnerable to process crashes and have certain strict timing dependencies, inadvertent violation of which may lead to failure of the distributed lock to prevent interfering, concurrent access by multiple processes, or to deadlock.

Figure 11:
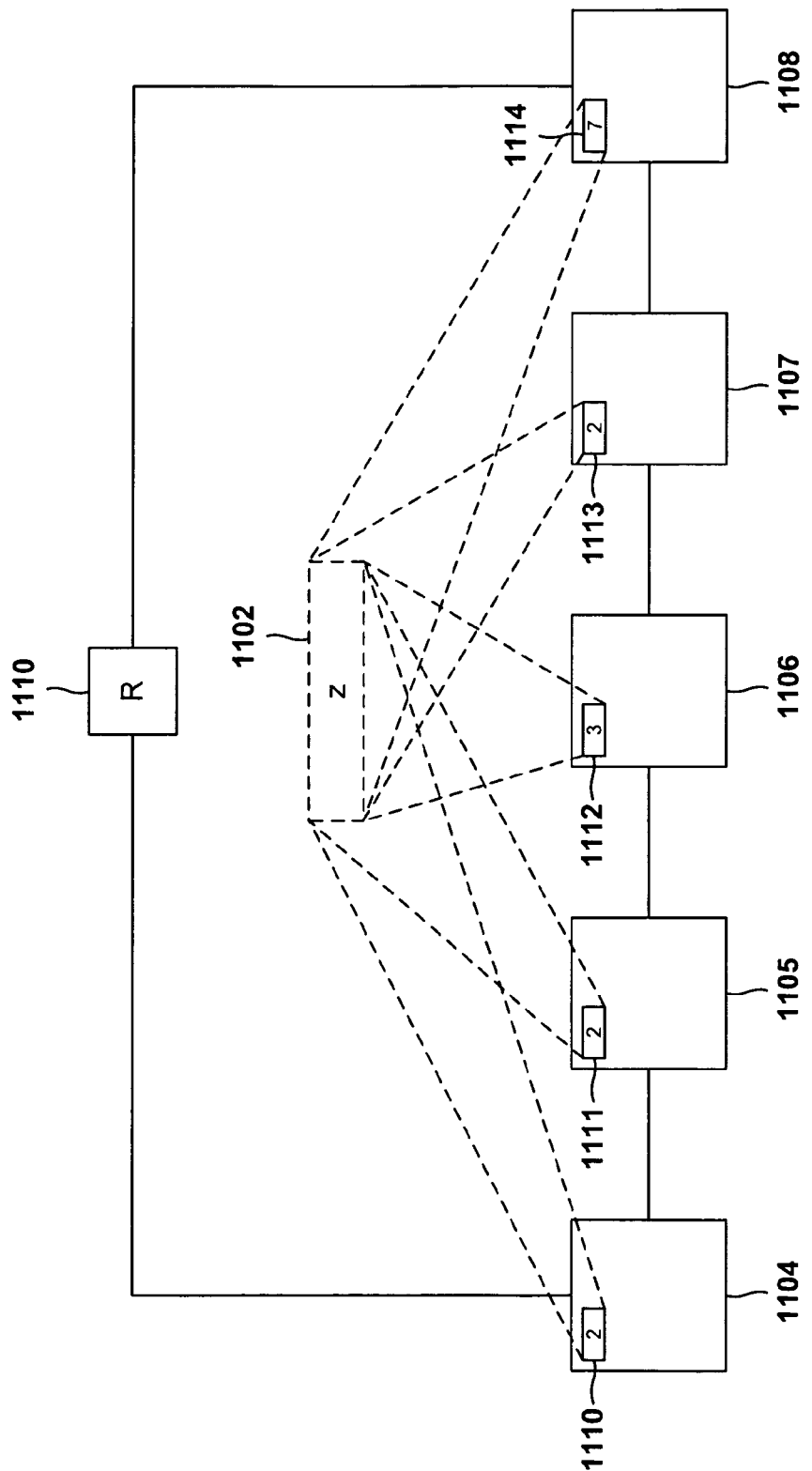
FIGS. 11-17 illustrate the basic operation of a storage register, using illustration conventions used in FIGS. 4-10.

Embodiments of the present invention employ a distributed storage register associated with a resource in order to implement a distributed lock for the resource. FIGS. 11-17 illustrate the basic operation of a storage register, using illustration conventions employed in FIGS. 4-10. As shown in FIG. 11, the distributed storage register 1102 is preferably an abstract, or virtual, register, rather than a physical register implemented in the hardware of one particular electronic device. Each process running on a processor or computer system 1104-1108 employs a small number of values stored in dynamic memory, and optionally backed up in non-volatile memory, along with a small number of distributed-storage-register-related routines, to collectively implement the distributed storage register 1002. At the very least, one set of stored values and routines is associated with each processing entity that accesses the distributed storage register. In some implementations, each process running on a physical processor or multi-processor system may manage its own stored values and routines and, in other implementations, processes running on a particular processor or multi-processor system may share the stored values and routines, providing that the sharing is locally coordinated to prevent concurrent access problems by multiple processes running on the processor.

In FIG. 11, each computer system maintains a local value 1110-1114 for the distributed storage register. In general, the local values stored by the different computer systems are normally identical, and equal to the value of the distributed storage register 1102. However, occasionally the local values may not all be identical, as in the example shown in FIG. 11, in which case, if a majority of the computer systems currently maintain a single locally stored value, then the value of the distributed storage register is the majority-held value.

In the example shown in FIG. 11, representing one embodiment of the present invention, processes running on the five computer systems 1104-1108 use the distributed storage register 1102 as a distributed lock to serialize access to a remote resource 1110 R. A distributed-storage-register-based distributed lock may be used to control concurrent access by remote processes to a single resource, or to a collection of resources, the collection of resources itself potentially distributed over a number of intercommunicating electronic devices.

Figure 12:
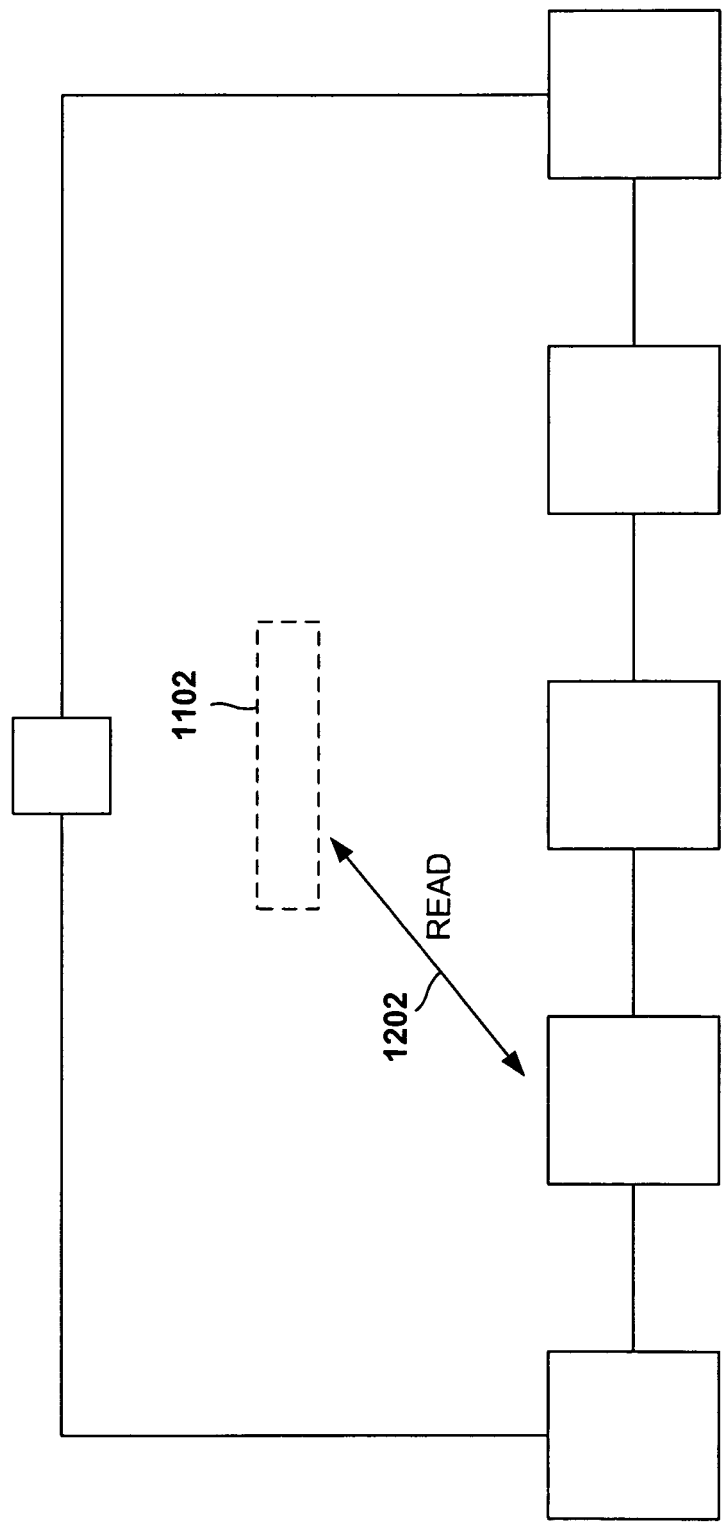
Figure 13:
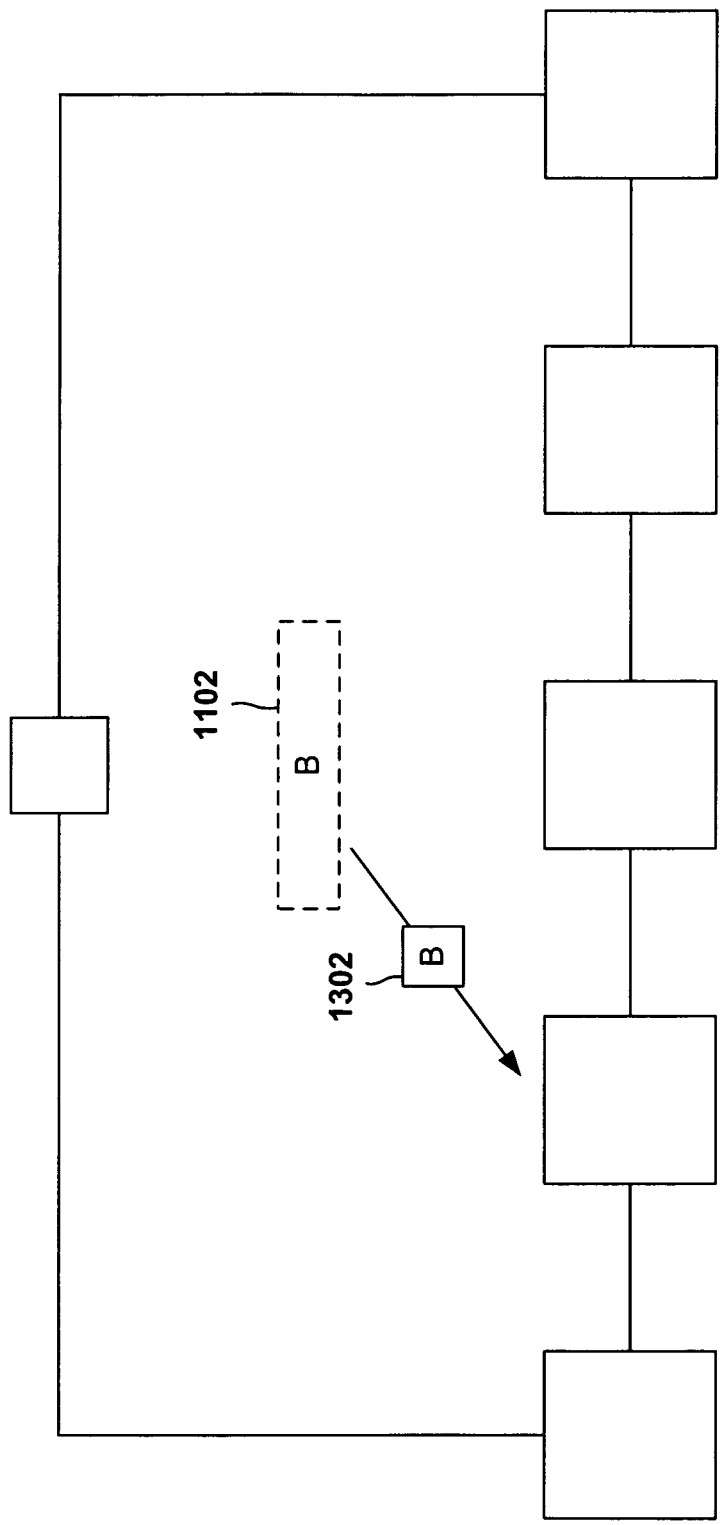
Figure 14:
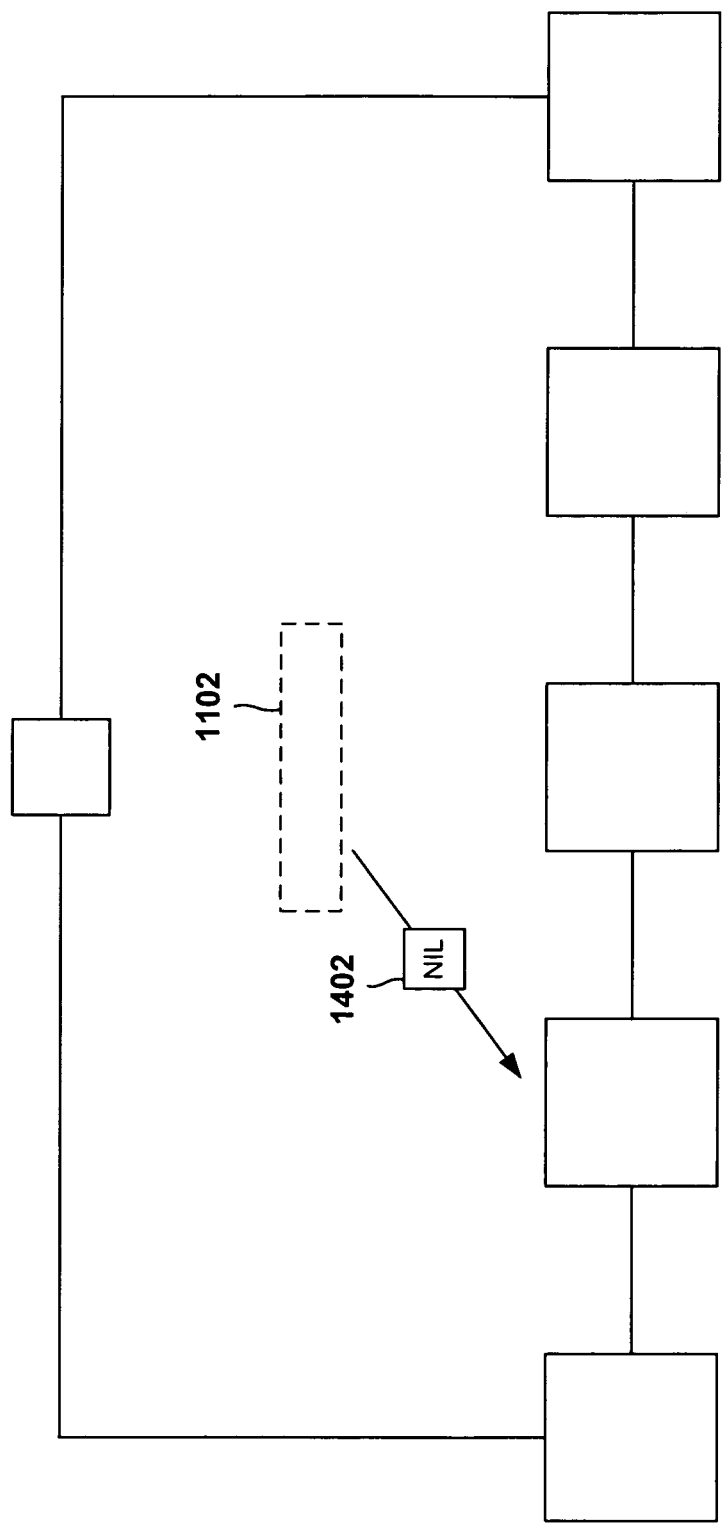

A distributed storage register provides two fundamental high-level functions to a number of intercommunicating processes that collectively implement the distributed storage register. As shown in FIG. 12, a process can direct a READ request 1202 to the distributed storage register 1102. If the distributed storage register currently holds a valid value, as shown in FIG. 13 by the value "B" within the distributed storage register 1102, the current, valid value is returned 1302 to the requesting process, as shown in FIG. 13. However, as shown in FIG. 14, if the distributed storage register 1102 does not currently contain a valid value, then the value NIL 1402 is returned to the requesting process. The value NIL is a value that cannot be a valid value stored within the distributed storage register.

Figure 15:
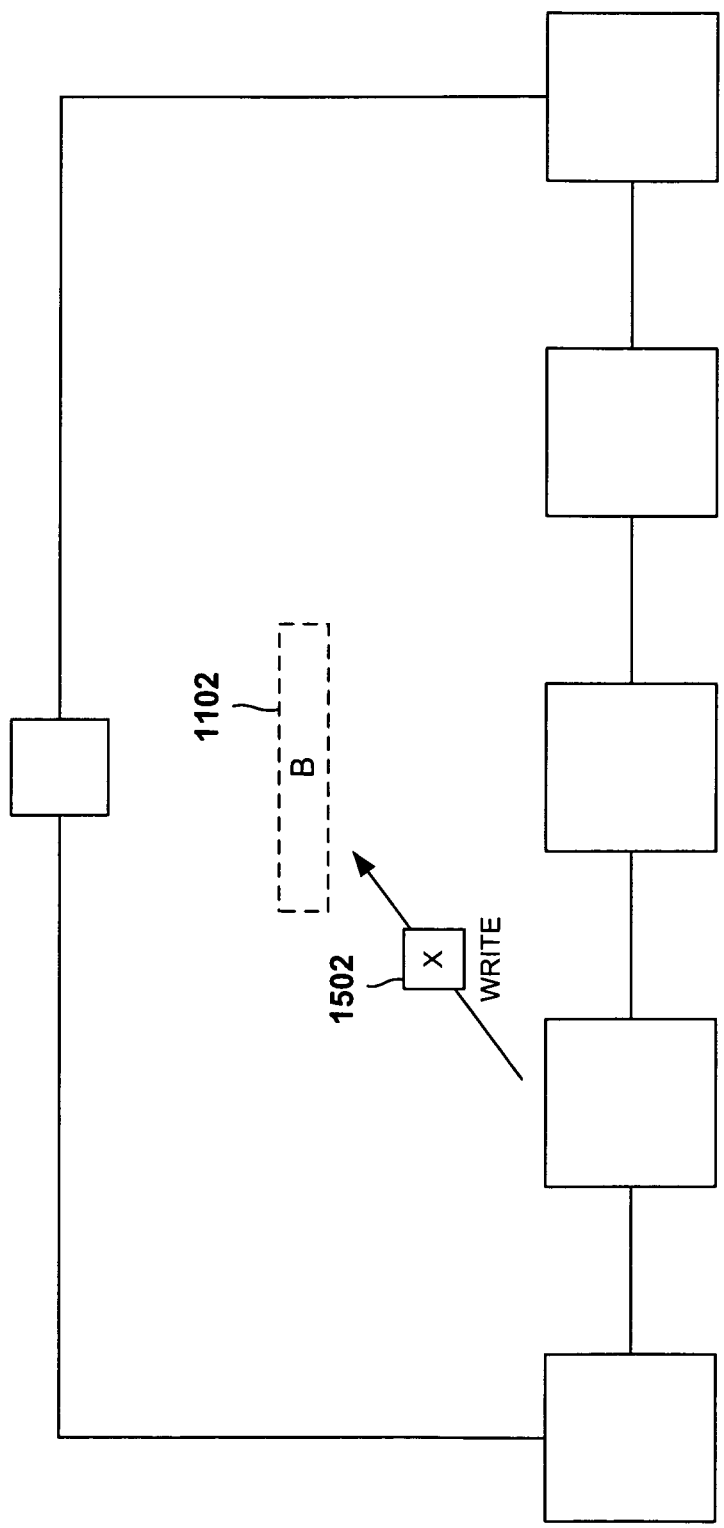
Figure 16:
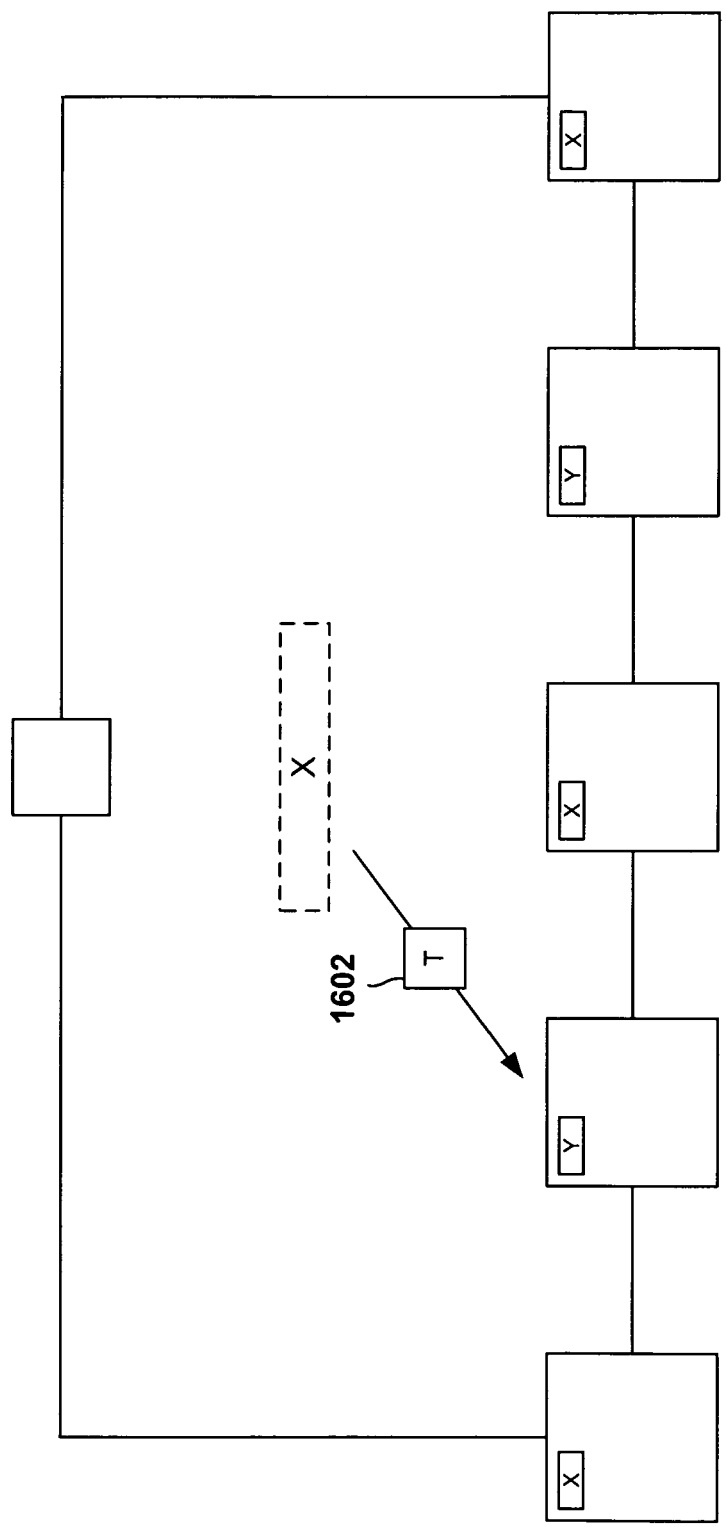
Figure 17:
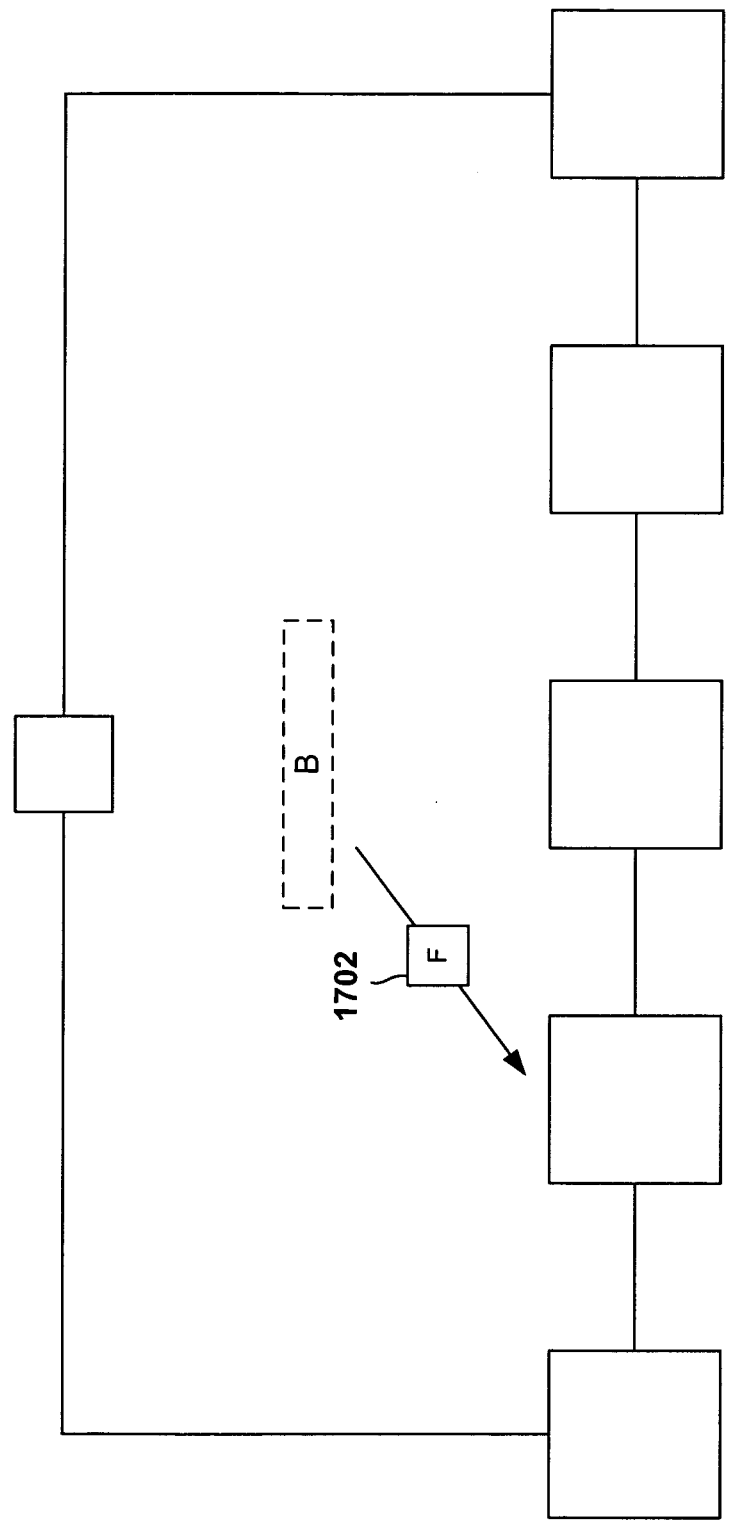

A process may also write a value to the distributed storage register. In FIG. 15, a process directs a WRITE message 1502 to the distributed storage register 1102, the WRITE message 1502 including a new value "X" to be written to the distributed storage register 1102. If the value transmitted to the distributed storage register successfully overwrites whatever value is currently stored in the distributed storage register, as shown in FIG. 16, then a Boolean value "TRUE" is returned 1602 to the process that directed the WRITE request to the distributed storage register. Otherwise, as shown in FIG. 17, the WRITE request fails, and a Boolean value "FALSE" is returned 1702 to the process that directed the WRITE request to the distributed storage register, the value stored in the distributed storage register unchanged by the WRITE request. In certain implementations, the distributed storage register returns binary values "OK" and "NOK," equivalent to the Boolean values "TRUE" and "FALSE."

Figure 18:
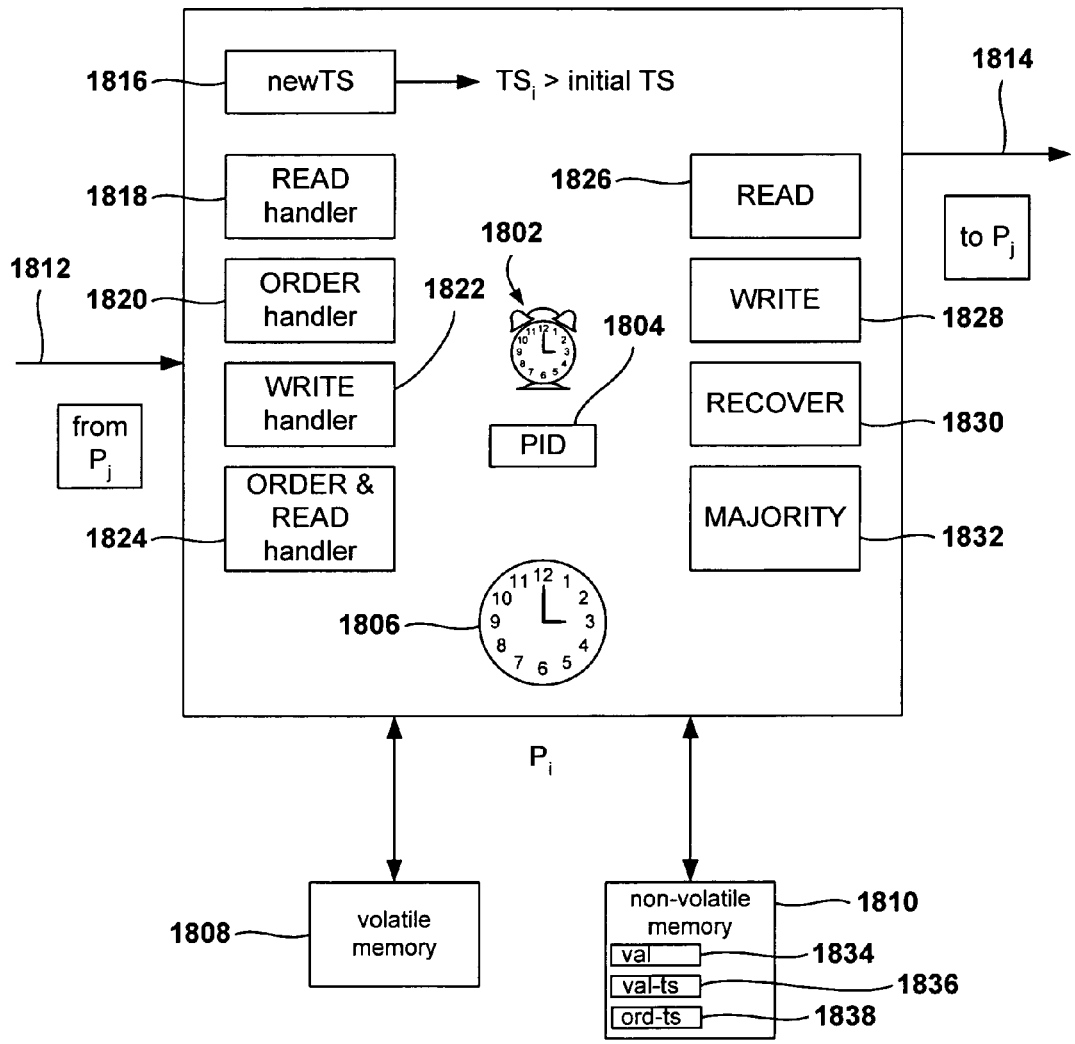
FIG. 18 shows the components used by a process or processing entity $P_i$ that implements, along with a number of other processes and/or processing entities, $P_{j \neq i}$, a distributed storage register.

FIG. 18 shows the components used by a process or processing entity $P_i$ that implements, along with a number of other processes and/or processing entities, $P_{j \neq i}$, a distributed storage register. A processor or processing entity uses three low level primitives: a timer mechanism 1802, a unique ID 1804, and a clock 1806. The processor or processing entity $P_i$ uses a local timer mechanism 1802 that allows $P_i$ to set a timer for a specified period of time, and to then wait for that timer to expire, with $P_i$ notified on expiration of the timer in order to continue some operation. A process can set a timer and continue execution, checking or polling the timer for expiration, or a process can set a timer, suspend execution, and be re-awakened when the timer expires. In either case, the timer allows the process to logically suspend an operation, and subsequently resume the operation after a specified period of time, or to perform some operation for a specified period of time, until the timer expires. The process or processing entity $P_i$ needs also to have a reliably stored and reliably retrievable local process ID ("PID") 1804. Each processor or processing entity needs to have a local PID that is unique with respect to all other processes and/or processing entities that together implement the distributed storage register. Finally, the processor processing entity $P_i$ needs to have a real-time clock 1806 that is roughly coordinated with some absolute time. The real-time clocks of all the processes and/or processing entities that together collectively implement a distributed storage register need not be precisely synchronized, but need to be reasonably reflective of some shared conception of absolute time. Most computers, including personal computers, include a battery-powered system clock that reflects a current, universal time value. For most purposes, including implementation of a distributed storage register, these system clocks need not be precisely synchronized, but only approximately reflective of a current universal time.

Each processor or processing entity $P_i$ includes a volatile memory 1808 and, in some embodiments, a non-volatile memory 1810. The volatile memory 1808 is used for storing instructions for execution and local values of a number of variables used for the distributed-storage-register protocol. The non-volatile memory 1810 is used for persistently storing the number of variables used, in some embodiments, for the distributed-storage-register protocol. Persistent storage of variable values provides a relatively straightforward resumption of a process' participation in the collective implementation of a distributed storage register following a crash or communications interruption. However, persistent storage is not required. Instead, as long as the variable values stored in dynamic memory, in non-persistent-storage embodiments, if lost, are all lost together, and provided that the variables are properly re-initialized, the distributed storage register protocol correctly operates, and progress of processes and processing entities using the distributed storage register is maintained. Each process $P_i$ stores three variables: (1) val 1834, which holds the current, local value for the distributed storage register; (2) val-ts 1836, which indicates the time-stamp value associated with the current local value for the distributed storage register; and (3) ord-ts 1838, which indicates the most recent time stamp associated with a WRITE operation. The variable val is initialized, particularly in non-persistent-storage embodiments, to a value NIL that is different from any value written to the distributed storage register by processes or processing entities, and that is, therefore, distinguishable from all other distributed-storage-register values. Similarly, the values of variables val-ts and ord-ts are initialized to the value "initialTS," a value less than any time-stamp value returned by a routine "newTS" used to generate time-stamp values. Providing that val, val-ts, and ord-ts are together re-initialized to these values, the collectively implemented distributed storage register tolerates communications interruptions and process and processing entity crashes, provided that at least a majority of processes and processing entities recover and resume correction operation.

Each processor or processing entity $P_i$ may be interconnected to the other processes and processing entities $P_{j\ne i}$ via a message-based network in order to receive 1812 and send 1814 messages to the other processes and processing entities $P_{j\ne i}$. Each processor or processing entity $P_i$ includes a routine "newTS" 1816 that returns a time stamp $TS_i$ when called, the time stamp $TS_i$ greater than some initial value "initialTS." Each time the routine "newTS" is called, it returns a time stamp $TS_i$ greater than any time stamp previously returned. Also, any time stamp value $TS_i$ returned by the newTS called by a processor or processing entity $P_i$ should be different from any time stamp $TS_j$ returned by newTS called by any other processor processing entity $P_j$. One practical method for implementing newTS is for newTS to return a time stamp TS comprising the concatenation of the local PID 1804 with the current time reported by the system clock 1806. Each processor or processing entity $P_i$ that implements the distributed storage register includes four different handler routines: (1) a READ handler 1818; (2) an ORDER handler 1820; (3) a WRITE handler 1822; and (4) an ORDER&READ handler 1824. It is important to note that handler routines should be implemented as critical sections, or single threaded by locks, to prevent race conditions in testing and setting local variable values. Each processor or processing entity $P_i$ needs also to have four operational routines: (1) READ 1826; (2) WRITE 1828; (3) RECOVER 1830; and (4) MAJORITY 1832. Both the four handler routines and the four operational routines are discussed in detail, below.

Correct operation of a distributed storage register, and liveness, or progress, of processes and processing entities using a distributed storage register depends on a number of assumptions. Each process or processing entity $P_i$ is assumed to not behave maliciously. In other words, each processor or processing entity $P_i$ faithfully adheres to the distributed-storage-register protocol. Another assumption is that a majority of the processes and/or processing entities $P_i$ that collectively implement a distributed storage register either never crash or eventually stop crashing and execute reliably. As discussed above, a distributed storage register implementation is tolerant to lost messages, communications interruptions, and process and processing entity crashes that affect, at any given time, a minority of processes and processing entities. As mentioned above, all of the processes and/or processing entities are fully interconnected by a message-based network. The message-based network is asynchronous, with no bounds on message-transmission times. However, a fair-loss property for the network is assumed, which essentially guarantees that if $P_i$ receives a message m from $P_j$, then $P_j$ sent the message m, and also essentially guarantees that if $P_i$ repeatedly transmits the message m to $P_j$, $P_j$ will eventually receive message m, if $P_j$ is a correct process or processing entity. Again, as discussed above, it is assumed that the system clocks for all processes or processing entities are all reasonably reflective of some shared time standard, but need not be precisely synchronized.

These assumptions are useful to prove correctness of the distributed-storage-register protocol and to gurantee progress. However, in practical implementations, one or more of the assumptions may be violated, and a reasonably correct and useful distributed lock nonetheless obtained. In addition, additional safeguards may be built into the handler routines and operational routines in order to overcome particular deficiencies in the hardware platforms and processing entities.

Figure 19:
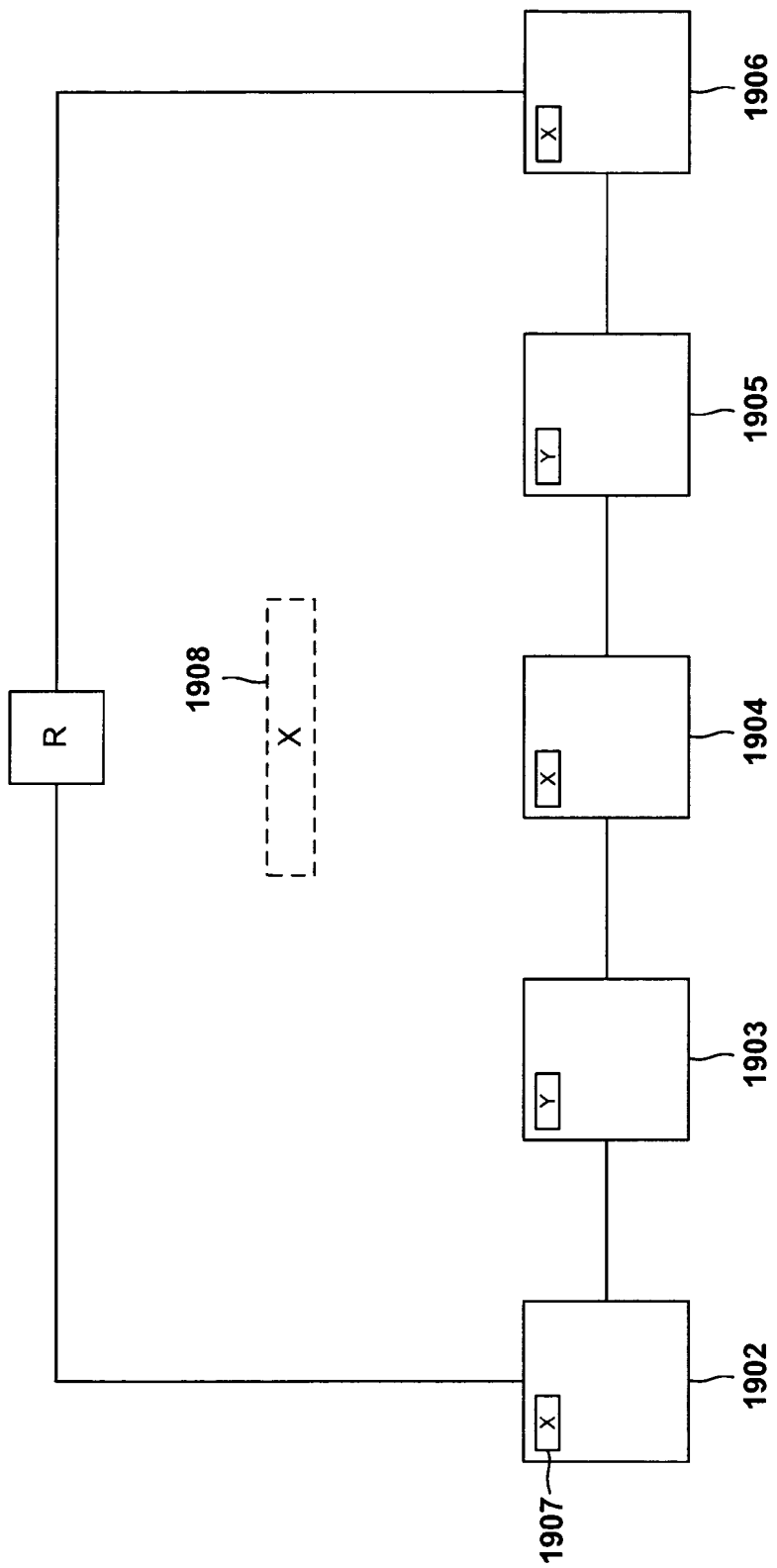
FIG. 19 illustrates determination of the current value of a distributed storage register by means of a quorum.

Operation of the distributed storage register is based on the concept of a quorum. FIG. 19 illustrates determination of the current value of a distributed storage register by means of a quorum. FIG. 19 uses similar illustration conventions as used in FIGS. 11-17. In FIG. 19, each of the processes or processing entities 1902-1906 maintains the local variable, val-ts, such as local variable 1907 maintained by process or processing entity 1902, that holds a local time-stamp value for the distributed storage register. If, as in FIG. 19, a majority of the local values maintained by the various processes and/or processing entities that collectively implement the distributed storage register currently agree on a time-stamp value val-ts, associated with the distributed storage register, then the current value of the distributed storage register 1908 is considered to be the value of the variable val held by the majority of the processes or processing entities. If a majority of the processes and processing entities cannot agree on a time-stamp value val-ts, or there is no single majority-held value, then the contents of the distributed storage register are undefined. However, a minority-held value can be then selected and agreed upon by a majority of processes and/or processing entities, in order to recover the distributed storage register.

FIG. 20 shows pseudocode implementations for the routine handlers and operational routines shown diagrammatically in FIG. 18. It should be noted that these pseudocode implementations omit detailed error handling and specific details of low-level communications primitives, local locking, and other details that are well understood and straightforwardly implemented by those skilled in the art of computer programming. The routine "majority" 2002 sends a message, on line 2, from a process or processing entity $P_i$ to itself and to all other processes or processing entities $P_{j \ne i}$ that, together with $P_i$, collectively implement a distributed storage register. The message is periodically resent, until an adequate number of replies are received, and, in many implementations, a timer is set to place a finite time and execution limit on this step. Then, on lines 34, the routine "majority" waits to receive replies to the message, and then returns the received replies on line 5. The assumption that a majority of processes are correct, discussed above, essentially guarantees that the routine "majority" will eventually return, whether or not a timer is used. In practical implementations, a timer facilitates handling error occurrences in a timely manner. Note that each message is uniquely identified, generally with a time stamp or other unique number, so that replies received by process $P_i$ can be correlated with a previously sent message.

The routine "read" 2004 reads a value from the distributed storage register. On line 2, the routine "read" calls the routine "majority" to send a READ message to itself and to each of the other processes or processing entities $P_{j \ne i}$. The READ message includes an indication that the message is a READ message, as well as the time-stamp value associated with the local, current distributed storage register value held by process $P_i$, val-ts. If the routine "majority" returns a set of replies, all containing the Boolean value "TRUE," as determined on line 3, then the routine "read" returns the local current distributed-storage-register value, val. Otherwise, on line 4, the routine "read" calls the routine "recover."

The routine "recover" 2006 seeks to determine a current value of the distributed storage register by a quorum technique. First, on line 2, a new time stamp ts is obtained by calling the routine "newTS." Then, on line 3, the routine "majority" is called to send ORDER&READ messages to all of the processes and/or processing entities. If any status in the replies returned by the routine "majority" are "FALSE," then "recover" returns the value NIL, on line 4. Otherwise, on line 5, the local current value of the distributed storage register, val, is set to the value associated with the highest value time stamp in the set of replies returned by routine "majority." Next, on line 6, the routine "majority" is again called to send a WRITE message that includes the new time stamp ts, obtained on line 2, and the new local current value of the distributed storage register, val. If the status in all the replies has the Boolean value "TRUE," then the WRITE operation has succeeded, and a majority of the processes and/or processing entities now concur with that new value, stored in the local copy val on line 5. Otherwise, the routine "recover" returns the value NIL.

The routine "write" 2008 writes a new value to the distributed storage register. A new time stamp, ts, is obtained on line 2. The routine "majority" is called, on line 3, to send an ORDER message, including the new time stamp, to all of the processes and/or processing entities. If any of the status values returned in reply messages returned by the routine "majority" are "FALSE," then the value "NOK" is returned by the routine "write," on line 4. Otherwise, the value val is written to the other processes and/or processing entities, on line 5, by sending a WRITE message via the routine "majority." If all the status vales in replies returned by the routine "majority" are "TRUE," as determined on line 6, then the routine "write" returns the value "OK." Otherwise, on line 7, the routine "write" returns the value "NOK." Note that, in both the case of the routine "recover" 2006 and the routine "write," the local copy of the distributed-storage-register value val and the local copy of the time stamp value val-ts are both updated by local handler routines, discussed below.

Next, the handler routines are discussed. At the onset, it should be noted that the handler routines compare received values to local-variable values, and then set local variable values according to the outcome of the comparisons. These types of operations should be strictly serialized, and protected against race conditions within each process and/or processing entity. Local serialization is easily accomplished using critical sections or local locks based on atomic test-and-set instructions. The READ handler routine 2010 receives a READ message, and replies to the READ message with a status value that indicates whether or not the local copy of the time stamp val-ts in the receiving process or entity is equal to the time stamp received in the READ message, and whether or not the time stamp ts received in the READ message is greater than or equal to the current value of a local variable ord-ts. The WRITE handler routine 2012 receives a WRITE message determines a value for a local variable status, on line 2, that indicates whether or not the local copy of the time stamp val-ts in the receiving process or entity is greater than the time stamp received in the WRITE message, and whether or not the time stamp ts received in the WRITE message is greater than or equal to the current value of a local variable ord-ts. If the value of the status local variable is "TRUE," determined on line 3, then the WRITE handler routine updates the locally stored value and time stamp, val and val-ts, on lines 4-5, both in dynamic memory and in persistent memory, with the value and time stamp received in the WRITE message. Finally, on line 6, the value held in the local variable status is returned to the process or processing entity that sent the WRITE message handled by the WRITE handler routine 2012.

The ORDER&READ handler 2014 computes a value for the local variable status, on line 2, and returns that value to the process or processing entity from which an ORDER&READ message was received. The computed value of status is a Boolean value indicating whether or not the time stamp received in the ORDER&READ message is greater than both the values stored in local variables val-ts and ord-ts. If the computed value of status is "TRUE," then the received time stamp ts is stored into both dynamic memory and persistent memory in the variable ord-ts.

Similarly, the ORDER handler 2016 computes a value for a local variable status, on line 2, and returns that status to the process or processing entity from which an ORDER message was received. The status reflects whether or not the received time stamp is greater than the values held in local variables val-ts and ord-ts. If the computed value of status is "TRUE," then the received time stamp ts is stored into both dynamic memory and persistent memory in the variable ord-ts.

Figure 21:
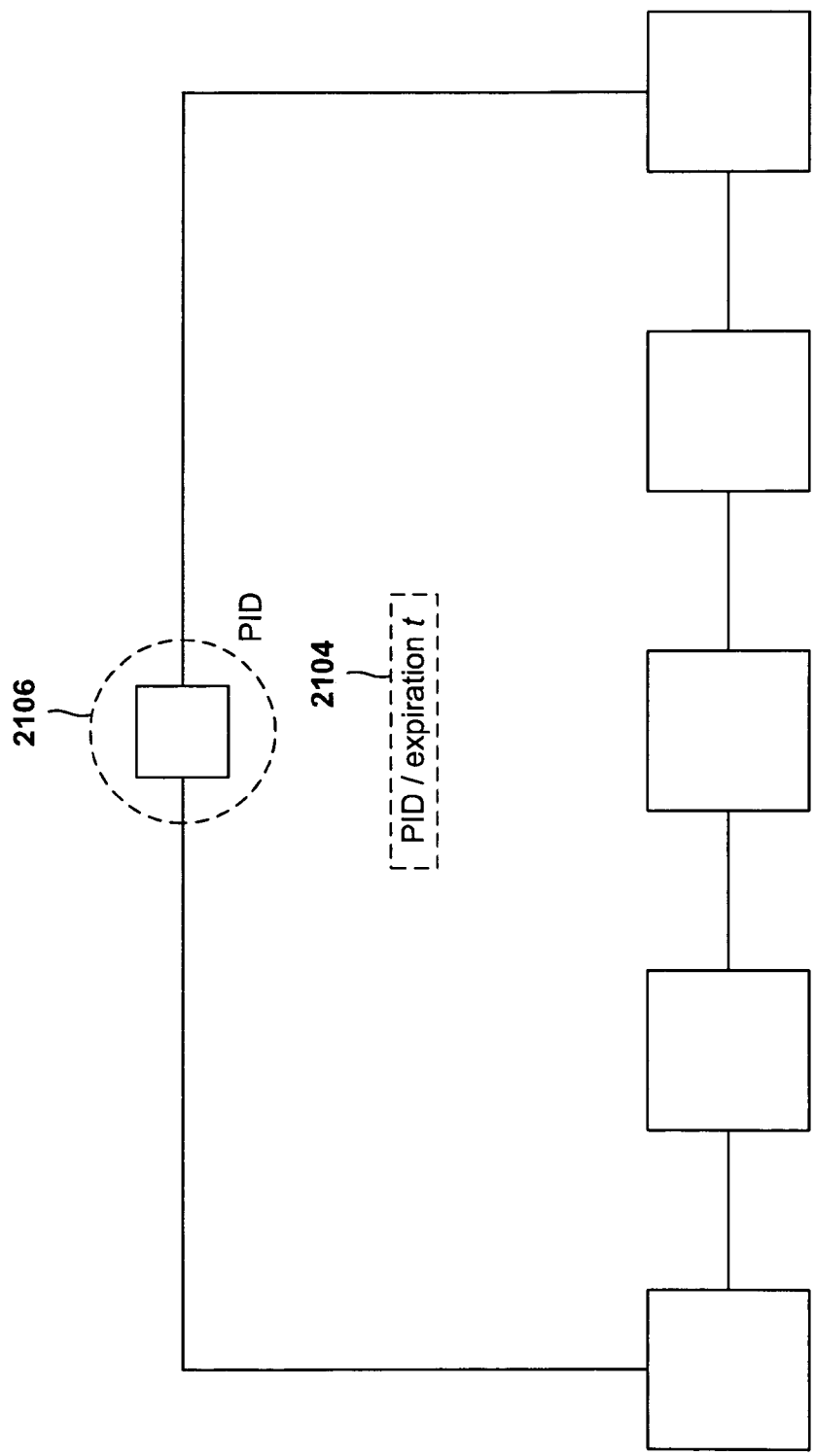
FIG. 21 shows a distributed-lock protocol based on a distributed storage register that represents one embodiment of the present invention.

Having a distributed storage register, implemented by the stored values, handler routines, and operational routines discussed above, a set of processes and/or processing entities can associate a distributed storage register with one or more resources for which access should be serialized, to allow concurrent sharing of the one or more recent sources by the processes and/or processing entities that collectively implement the associated distributed storage register. FIG. 21 shows a distributed-lock protocol based on a distributed storage register that represents one embodiment of the present invention. As shown in FIG. 21, the distributed storage register 2104 holds the concatenated values of a PID for a process holding the distributed lock, and an expiration time for the lock. When the distributed storage register holds a PID/expiration-time value, then the resource or resources associated with the distributed storage register is considered to be locked 2106 by the process or processing entity with the PID. When no process or processing entity holds the lock, then the resource or resources associated with the distributed storage register is considered to be not locked. A special value "NONE" or "NO PROCESS" may be used to indicate that no process currently holds the distributed lock. The distributed lock thus allows any given process or processing entity to lease the resource or resources associated with the distributed storage register for a specified period of time.

It should be noted that a variety of different lock semantics may be associated with a distributed lock. The distributed lock may be a lock only with respect to certain types of operations, such as WRITE operations, directed to a resource, or may lock a resource to all operations directed to the resource by processes and/or processing entities that do not hold the lock. Additionally, the lock may allow up to a specified maximum number of processes to concurrently access the resource or resources associated with the lock. As discussed above, resources may be devices, data, memory regions, data structures, logical entities, including volumes, and any other device or computational resource for which multiple processes or processing entities may concurrently, simultaneously, or both concurrently and simultaneously contend.

Various different distributed-lock protocols may be implemented in order to create the distributed lock, based on a distributed storage register, illustrated in FIG. 21. Two alternative implementations are next described. Again, as with the distributed-storage-lock protocol, discussed above, processes and/or processing entities that cooperatively share a resource using the distributed lock are assumed to not behave maliciously, and to adhere faithfully to the distributed-lock protocol.

Figure 22:
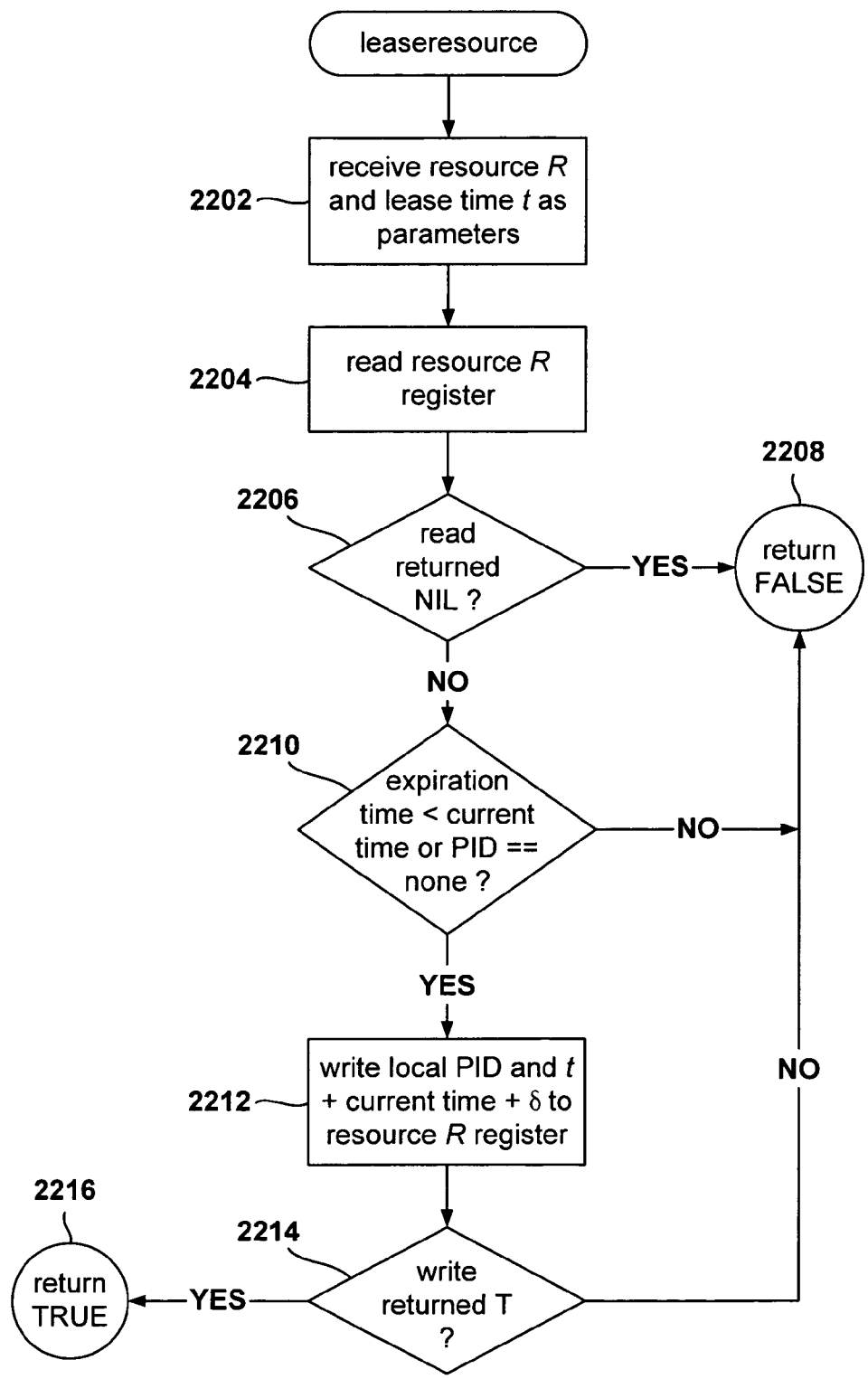
FIG. 22 shows a simple distributed-lock protocol implemented by a routine "leaseResource" that represents one embodiment of the present invention.

FIG. 22 shows a simple distributed-lock protocol implemented by a routine "leaseResource." The routine "leaseResource" is called by a process or processing entity in order to lock a resource or set of resources associated with a distributed storage register for a specified period of time. In step 2202, the routine "leaseResource" receives an identifier R that identifies the particular resource or resources for which a lock is desired, and a lease time t for which the lock is desired. Note that a process or processing entity may concurrently access a number of different resources or sets of resource, each associated with a separate distributed lock, by locking the different resources through separate calls to "leaseResource." In step 2204, the routine "leaseResource" reads the contents of the distributed storage register associated with resource or resources R using the above-described distributed-storage-register protocol. If the READ operation in step 2204 returns the value NIL, as determined in step 2206, then the routine "leaseResource" returns the value "FALSE" in step 2208. Otherwise, if the expiration time read from the distributed storage register is less than the current time obtained from the local system clock, or the PID read from the distributed storage register has the value "NONE" or "NO PROCESS" as determined in step 2210, then, in step 2212, the routine "leaseResource" writes the local PID of the process or processing entity calling the routine "leaseResource" and a time value equal to t+current_system_time+8 to the distributed storage register associated with resource or resources R. If the WRITE operation, carried on in step 2212, returns the Boolean value "TRUE," as determined in step 2214, then the routine "leaseResource" returns a value "TRUE" in step 2216. Otherwise, the routine "leaseResource" returns the Boolean value "FALSE", in step 2208. Note that, in step 2210, the comparison of the expiration time with the current time is sufficient to guarantee that the lease has expired, because the value 8 added to the expiration-time computation, in step 2212, pads the expiration time to account for the lack of precise synchronization between system clocks of the various processes and processing entities. Note also that a process or processing entity should not attempt to access the resource or set of resources following expiration of a lease, without again calling the routine "leaseResource." The value 8 may depend on communications media and systems, and may be in the range of milliseconds, seconds, minutes, tens of minutes, or longer time intervals. A process can guarantee that it adheres to the distributed-lock protocol by, among other methods, setting a timer upon taking out a lease, and checking for timer expiration prior to accessing the leased resource or set of resources. Note also that, when many processes or processing entities contend for the resource or set of resources over a period of time, access to the resource or resources is not guaranteed within a particular time interval to any individual process or processing entity by the implementation of the routine "leaseResource" shown in FIG. 22.

Figure 23:
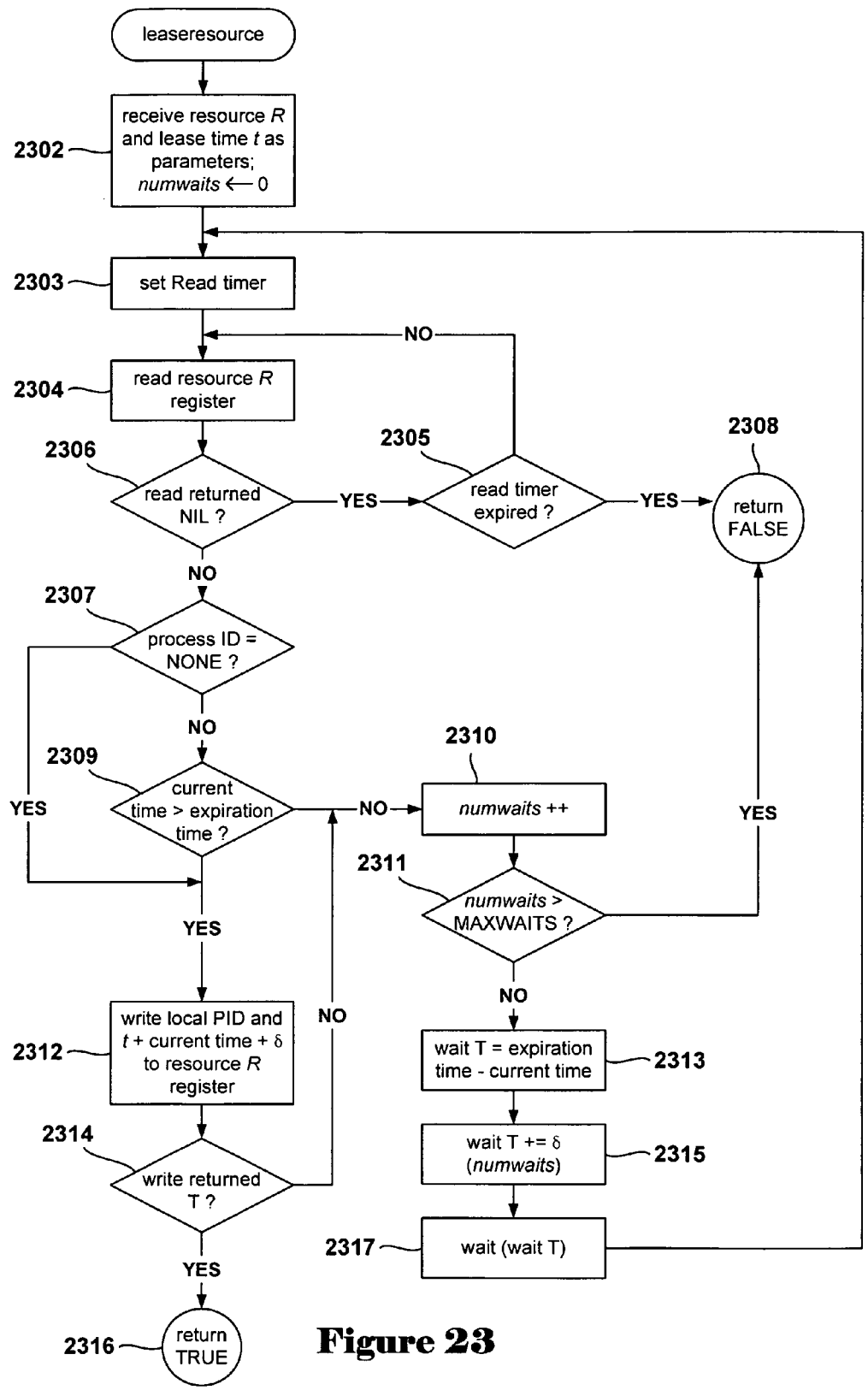
FIG. 23 shows an alternative, more complex implementation of the routine "leaseResource" that represents an alternative embodiment of the present invention.

FIG. 23 shows an alternative, more complex implementation of the routine "leaseResource." The alternative implementation shown in FIG. 23 shares a number of the same steps as the implementation shown in FIG. 22. Steps 2302, 2304, 2306, 2308, 2312, 2314, and 2316 in the alternative implementation shown in FIG. 23 are similar or identical to steps 2202, 2204, 2206, 2208, 2210, 2212, 2214, and 2216 in FIG. 22, and are not again described, in the interest of brevity. In the alternative implementation, a local variable numwaits is initialized to 0 in step 2302. In the alternative implementation, a READ timer is set to a specified value in step 2303. If the READ operation in step 2304 fails, as determined in step 2306, the READ operation may be repeatedly retried until the READ operation succeeds for a period of time for which the READ timer is set in step 2303. New step 2305 checks for timer expiration before retrying the READ operation. In step 2307, if the value read from the distributed storage register in the READ operation of step 2304 includes an indication that no process currently has the resource or set of resources locked, then the expiration-to-current-time comparison in step 2309 is omitted. In step 2309 the current time determined from the system clock is compared to the expiration time. If the current time is greater, then, in step 2310, the contents of the local variable numwaits is incremented. If the contents of local variable numwaits is greater than a constant MAX-WAITS, as determined in step 2311, then the routine "leaseResource" returns the value "FALSE" in step 2308. Otherwise, a wait time wait is computed in steps 2313 and 2315, and the routine "leaseResource" waits, in step 2317, for the computed time wait before retrying acquisition of the lock, beginning at step 2303. The wait time is the time until the current lease expires, as determined in step 2313, plus some additional period of time computed by the function δ( ) based on the current value of numwaits. This computation of the wait time therefore allows for a back off procedure so that, during periods of high contention, processes wait for longer periods of time before again attempting to lease the resource. Note that the lease retry operation of steps 2310, 2311, 2313, 2315, and 2317 are executed only when another process or processing entity currently holds the distributed lock, as determined in steps 2307 and 2309. Then, in steps 2312, 2314, and 2316, the routine "leaseResource" attempts to lease the resource or set of resources in the same manner as the first version of the routine "leaseResource," shown in FIG. 22, with an exception at, if the WRITE fails, the retry process beginning at step 2310 is invoked.

It should be noted that there are no strict time dependencies related to the distributed lease that represents one embodiment of the present invention. The distribute storage register, underlying the distributed lease, relies only on a system clock accessible to all intercommunicating processes and/or processing entities. Note also that the distributed lease can operate, even when a number of processes or processing entities have failed. The distributed lease is thus robust and reliable. The distributed lease is also efficient, with respect to the number of messages transmitted between processes and/or processing entities in order to lock a resource.

Although the present invention has been described in terms of a particular embodiment, it is not intended that the invention be limited to this embodiment. Modifications within the spirit of the invention will be apparent to those skilled in the art. For example, an almost limitless number of different implementations of the distributed-storage-register protocol and distributed-lock protocol are possible using different programming languages, different modular organizations, control structures, and other typical programming variations. Moreover, both protocols may be implemented in firmware, software, or in hardware-logic circuits. In addition, any combination of hardware-logic circuits, firmware, and software may be used to implement both the distributed-storage-register protocol and the distributed-lock protocol. The distributed storage register is but one example of a quorum-based, abstract register that may be employed to implement a distributed-lock protocol. Any abstract register that provides for reliable, atomic READ and WRITE operations by distributed processes can be used to implement the distributed lock. Several alternative embodiments of the "leaseResource" routine are discussed, above. In addition to these routines, a lease-release routine can be simply implemented by allowing a process or processing entity to write the value "NONE" or "NO PROCESS" to the distributed storage register when the process or processing entity calling the lease-release routine currently holds the distributed lock. Additional types of distributed-lock protocols are also possible. For example, instead of implementing a lease routine, as discussed above, a simple lock routine, without an associated expiration time, can be implemented by removing the expiration time from the values stored in the distributed storage register. Many additional variations on a distributed lock are also possible. In certain implementations, the distributed storage register may only store one of two values: "LOCKED" and "UNLOCKED," with processes or processing entities that successfully acquire the distributed lock responsible for making sure that they locally keep track of lock acquisition, and with a distributed means for clearing a distributed lock when a processing entity holding the distributed lock fails. In other implementations, both a binary locked/unlocked value and an expiration time may be stored in the distributed storage register. As discussed above, the distributed lock may be collectively implemented and used for concurrent access control by processes or processing entities that intercommunicate by a message-passing system. Although distributed processes and/or processing entities interconnected by a computer network are a useful example of a system in which distributed locks may find utility, distributed locks implemented by the method of the present invention may also find utility for concurrency control of multiple processes, threads, or other such processing entities executing within a single processing entity where the processes, threads, or other processing entities intercommunicate by some form of message passing, including shared-memory message passing.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A distributed lock, collectively implemented by a number of intercommunicating entities, the distributed lock comprising:
   a distributed storage register having a time stamp value associated with a most recently performed process, wherein the time stamp value is determined by a majority of the entities; and
   a distributed lock protocol, wherein the distributed lock protocol directs each of the entities to:
   store the time stamp value locally at each of the intercommunicating entities; and
   request a quorum to determine the time stamp value when a resource shared by the intercommunicating entities is requested to be used by one of the intercommunicating entities.

2. The distributed lock of claim 1 wherein entities include processes and processing entities.

3. The distributed lock of claim 1 wherein the distributed storage register is a virtual register implemented by the number of entities, each entity employing a set of handler routines, operational routines, primitives, and local variable values.

4. The distributed lock of claim 3 wherein the local variable values include:
   a local distributed storage register value, val;
   a local time-stamp value associated with the local distributed storage register value, val-ts;
   and a local time-stamp associated with a most recent WRITE operation, ord-ts.

5. The distributed lock of claim 4 wherein the value of the distributed storage register is determined, by a value-seeking entity, by:
   sending a READ message, including the value-seeking entity's local variable value val-ts, from the value-seeking entity to the entities that collectively implement the distributed lock, requesting that the entities return an indication of whether their local val- ts values are equal to the time-stamp value in the READ message, and whether the time-stamp value in the READ message is greater than or equal to their local time-stamp values ord-ts.

6. The distributed lock of claim 4 wherein the value of the distributed storage register is written, by a writing entity, by:
   obtaining a new time-stamp value ts;
   sending an ORDER message, including the value ts, from the writing entity to the entities that collectively implement the distributed lock, requesting that the entities return an indication of whether their local val-ts and ord-ts values are less than the time-stamp value ts in the ORDER message; and
   sending a WRITE message, including a new value for the distributed storage register and the value ts, from the writing entity to the entities that collectively implement the distributed lock, requesting that the entities update their local variable values val and val-ts to the new value for the distributed storage register and ts, respectively.

7. The distributed lock of claim 3 wherein handler routines receive messages sent by an entity and reply to the entity, the handler routines including:
- a READ message handler;
- a WRITE message handler;
- an ORDER message handler; and
- an ORDER&READ message handler.

8. The distributed lock of claim 3 wherein operational routines send messages and receive replies, the operational routines including:
- a READ routine;
- a WRITE routine;
- a RECOVER routine; and
- and a MAJORITY routine.

9. The distributed lock of claim 3 wherein the primitives include:
- a timer mechanism;
- a system clock that is reflective of a time common to all of the entities that collectively implement the distributed lock, but that needs to be synchronized with the system clocks of other entities that collectively implement the distributed lock only loosely, within a drift that may be a time interval in the range of one of millisecond, second, minutes, tens of minutes, or a longer time interval; and
- an identifier unique among the entities that collectively implement the distributed lock.

10. The distributed lock of claim 1 wherein the distributed storage register contains either a locked indication or an unlocked indication.

11. The distributed lock of claim 10 wherein the locked indication includes an identifier indicating which entity currently holds the distributed lock.

12. The distributed lock of claim 11 wherein an entity locks a resource associated with the distributed lock, in accordance with the distributed lock protocol, by:
- reading the current value of the distributed storage register to determine whether or not the resource is currently locked by an entity by determining whether or not the distributed storage register contains a locked indication; and
- when the current value of the distributed storage register is an unlocked indication, writing the entity's ID to the distributed storage register.

13. The distributed lock of claim 12 wherein the entity retries reading the current value of the distributed storage register when the current value of the distributed storage register is a locked indication.

14. The distributed lock of claim 13 wherein the entity retries reading the current value of the distributed storage register after varying intervals, to prevent starvation of other entities contending for the lock.

15. The distributed lock of claim 10 wherein the locked indication includes an identifier indicating which entity currently holds the distributed lock and an expiration time.

16. The distributed lock of claim 15 wherein an entity locks a resource associated with the distributed lock, in accordance with the distributed lock protocol, by:
- reading the current value of the distributed storage register to determine whether or not the resource is currently locked by an entity by determining whether or not the distributed storage register contains a locked indication; and
- when the current value of the distributed storage register is an unlocked indication or when the expiration time of in the locked indication in the distributed storage register is less than a local system time, writing the entity's ID and an expiration time to the distributed storage register.

17. The distributed lock of claim 16 wherein the entity retries reading the current value of the distributed storage register when the current value of the distributed storage register is a locked indication.

18. The distributed lock of claim 17 wherein the entity retries reading the current value of the distributed storage register after varying intervals, to prevent starvation of other entities contending for the lock.

19. The distributed lock of claim 10 wherein an expiration time is a sum of a current system time, a time for holding the distributed lock, and a drift time to account for loose synchronicity between system clocks of the entities that collectively implement the distributed lock.

20. Computer instructions that implement the distributed lock of claim 1 on each entity stored in a computer readable medium.

21. A method for controlling access to a resource by multiple concurrently or simultaneously accessing entities, the method comprising:
- implementing, by the concurrently or simultaneously accessing entities, a distributed storage register having a time stamp value associated with a most recently performed process, wherein the time stamp value is determined by a majority of the entities; and
- storing a locked indication in the distributed storage register by an entity to indicate that the resource is locked in accordance with a distributed lock protocol, wherein the distributed lock protocol directs each of the entities to:
- store the time stamp value locally at each of the intercommunicating entities; and
- request a quorum to determine the time stamp value when a resource shared by the intercommunicating entities is requested to be used by one of the intercommunicating entities.

22. The method of claim 21 wherein the distributed storage register is a virtual register implemented by the number of entities, each entity employing a set of handler routines, operational routines, primitives, and local variable values.

23. The method of claim 22 wherein the local variable values include:
- a local distributed storage register value, val;
- a local time-stamp value associated with the local distributed storage register value, val-ts; and
- a local time-stamp associated with a most recent WRITE operation, ord-ts.

24. The method of claim 23 wherein the value of the distributed storage register is determined, by a value-seeking entity, by:
- sending a READ message, including the value-seeking entity's local variable value val-ts, from the value-seeking entity to the entities that collectively implement the distributed lock, requesting that the entities return an indication of whether their local val-ts values are equal to the time-stamp value in the READ message, and whether the time-stamp value in the READ message is greater than or equal to their local time-stamp values ord-ts.

25. The method of claim 23 wherein the value of the distributed storage register is written, by a writing entity, by:
- obtaining a new time-stamp value ts;
- sending an ORDER message, including the value ts, from the writing entity to the entities that collectively implement the distributed lock, requesting that the entities return an indication of whether their local val-ts and ord-ts values are less than the time-stamp value ts in the ORDER message; and sending a WRITE message, including a new value for the distributed storage register and the value ts, from the writing entity to the entities that collectively implement the distributed lock, requesting that the entities update their local variable values val and val-ts to the new value for the distributed storage register and ts, respectively.

26. The method of claim 22 wherein the locked indication includes an identifier indicating which entity currently holds the distributed lock.

27. The method of claim 26 wherein an entity locks a resource associated with the distributed lock in accordance with the distributed lock protocol by:

reading the current value of the distributed storage register to determine whether or not the resource is currently locked by an entity by determining whether or not the distributed storage register contains a locked indication; and when the current value of the distributed storage register is an unlocked indication, writing the entity's ID to the distributed storage register.

28. The method of claim 27 wherein the entity retries reading the current value of the distributed storage register when the current value of the distributed storage register is a locked indication.

29. The metod of claim 27 wherein the entity retries reading the current value of the distributed storage register after varying intervals, to prevent starvation of other entities contending for the lock.

30. The method of claim 22 wherein the locked indication includes an identifier indicating which entity currently holds the distributed lock and an expiration time.

31. The method of claim 30 wherein an entity locks a resource associated with the distributed lock, using the distributed lock protocol, by:

reading the current value of the distributed storage register to determine whether or not the resource is currently locked by an entity by determining whether or not the distributed storage register contains a locked indication; and when the current value of the distributed storage register is an unlocked indication or when the expiration time of in the locked indication in the distributed storage register is less than a local system time, writing the entity's ID and an expiration time to the distributed storage register.

32. The distributed lock of claim 31 wherein the entity retries reading the current value of the distributed storage register when the current value of the distributed storage register is a locked indication.

33. The method of claim 32 wherein the entity retries reading the current value of the distributed storage register after varying intervals, to prevent starvation of other entities contending for the lock.

34. Computer instructions that implement the method of claim 22 stored in a computer readable medium.

35. A tangible, non-transitory, computer-readable medium, comprising code to direct a processor to:

implement, by the concurrently or simultaneously accessing entities, a distributed storage register having a time stamp value associated with a most recently performed process, wherein the time stamp value is determined by a majority of the entities; and store a locked indication in the distributed storage register by an entity to indicate that the resource is locked in accordance with a distributed lock protocol, wherein the distributed lock protocol directs each of the entities to:

store the time stamp value locally at each of the intercommunicating entities; and request a quorum to determine the time stamp value when a resource shared by the intercommunicating entities is requested to be used by one of the intercommunicating entities.

* * * * *

UNITED STATES PATENT AND TRADEMARK OFFICE
CERTIFICATE OF CORRECTION

PATENT NO. : 8,495,266 B2
APPLICATION NO. : 11/009214
DATED : July 23, 2013
INVENTOR(S) : James M. Reuter It is certified that error appears in the above-identified patent and that said Letters Patent is hereby corrected as shown below:

In the Claims

In column 14, line 48, in Claim 5, delete "val- ts" and insert -- val-ts --, therefor.

In column 15, line 14, in Claim 8, delete "and a" and insert -- a --, therefor.

In column 17, line 28, in Claim 29, delete "metod" and insert -- method --, therefor.

Signed and Sealed this
Nineteenth Day of November, 2013

Teresa Stanek Rea
*Deputy Director of the United States Patent and Trademark Office*